US012388592B2

(12) United States Patent
Takata et al.

(10) Patent No.: US 12,388,592 B2
(45) Date of Patent: *Aug. 12, 2025

(54) BASE STATION, TERMINAL, AND COMMUNICATION METHOD

(71) Applicant: Panasonic Intellectual Property Corporation of America, Torrance, CA (US)

(72) Inventors: Tomohumi Takata, Ishikawa (JP); Takashi Iwai, Ishikawa (JP); Hidetoshi Suzuki, Kanagawa (JP); Ayako Horiuchi, Kanagawa (JP); Joachim Loehr, Hessen (DE); Tetsuya Yamamoto, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/516,337

(22) Filed: Nov. 21, 2023

(65) Prior Publication Data

US 2024/0089052 A1 Mar. 14, 2024

Related U.S. Application Data

(63) Continuation of application No. 17/230,831, filed on Apr. 14, 2021, now Pat. No. 11,863,478, which is a (Continued)

(30) Foreign Application Priority Data

Aug. 5, 2016 (JP) .................................. 2016-154864

(51) Int. Cl.
*H04L 5/00* (2006.01)
*H04L 5/14* (2006.01)
(Continued)

(52) U.S. Cl.
CPC .......... *H04L 5/0048* (2013.01); *H04L 5/0053* (2013.01); *H04L 5/143* (2013.01); *H04L 27/0006* (2013.01); *H04L 27/2607* (2013.01)

(58) Field of Classification Search
CPC ...................................................... H04L 5/0048
See application file for complete search history.

(56) References Cited

U.S. PATENT DOCUMENTS 10,200,992 B2    2/2019  Dinan
11,012,208 B2 *  5/2021  Takata .................. H04L 5/0055
(Continued)

FOREIGN PATENT DOCUMENTS

JP       2015518667 A      7/2015
WO    WO 2014080744 A1    5/2014
(Continued)

OTHER PUBLICATIONS

International Search Report of PCT application No. PCT/JP2017/021088 dated Aug. 15, 2017.
(Continued)

*Primary Examiner* — Jason E Mattis
(74) *Attorney, Agent, or Firm* — Seed IP Law Group LLP

(57) ABSTRACT

A base station (100, 300) is provided with a transmitter and a receiver. The transmitter (109) transmits a downlink signal in a downlink transmission region, in a time unit that includes the downlink transmission region, an uplink transmission region, and a gap period that is a switching point between the downlink transmission region and the uplink transmission region. The receiver (111) receives an uplink signal in the uplink transmission region, in the time unit. Furthermore, a delay tolerant signal for which a delay is tolerated more than for the downlink signal and the uplink signal is mapped to within the gap period.

10 Claims, 28 Drawing Sheets

Related U.S. Application Data continuation of application No. 16/306,847, filed as application No. PCT/JP2017/021088 on Jun. 7, 2017, now Pat. No. 11,012,208.

(51) Int. Cl.
*H04L 27/00* (2006.01)
*H04L 27/26* (2006.01)

(56) References Cited

U.S. PATENT DOCUMENTS

| | | | |
|---|---|---|---|
| 2010/0273494 A1* | 10/2010 | Iwai | H04W 74/00 455/450 |
| 2013/0039233 A1 | 2/2013 | Dai et al. | |
| 2015/0043392 A1 | 2/2015 | Susitaival et al. | |
| 2015/0085721 A1 | 3/2015 | Meng | |
| 2015/0103704 A1 | 4/2015 | Skov et al. | |
| 2015/0341150 A1 | 11/2015 | Seo et al. | |
| 2015/0341910 A1 | 11/2015 | Hayashi et al. | |
| 2017/0086207 A1 | 3/2017 | Yokomakura et al. | |
| 2017/0222787 A1 | 8/2017 | Suzuki et al. | |
| 2017/0288841 A1* | 10/2017 | Park | H04L 1/1887 |
| 2018/0242372 A1 | 8/2018 | Yang et al. | |
| 2019/0089506 A1 | 3/2019 | Takeda et al. | |
| 2019/0150170 A1 | 5/2019 | Park et al. | |
| 2020/0322187 A1 | 10/2020 | He et al. | |

FOREIGN PATENT DOCUMENTS

| | | |
|---|---|---|
| WO | WO 2015174504 A1 | 11/2015 |
| WO | WO 2016021580 A1 | 2/2016 |

OTHER PUBLICATIONS

R1-164013, 3GPP TSG RAN WG1 #85, "Framework for beamformed access", May 23, 2016.
R1-165662, 3GPP TSG RAN WG1 #85, "WF on NR frame structure", May 23, 2016.
R1-165872, 3GPP TSG RAN WG1 #85, "WF on minimum HARQ Timing", May 23, 2016.
R1-165886, 3GPP TSG RAN WG1 #85, "WF on Scalable Numerology Symbol Boundary Alignment", May 23, 2016.
R1-165887, 3GPP TSG RAN WG1 #85, "WF on minimum HARQ Timing", May 23, 2016.
R1-166027, 3GPP TSG RAN WG1 #85, "WF on Frame Structure and Evaluation", May 23, 2016.

* cited by examiner

FIG. 11

| DELAY TOLERANT SIGNAL INSTRUCTION INFORMATION | GENERATED SIGNAL |
|---|---|
| 0 | NO DELAY TOLERANT SIGNAL |
| 1 | SRS |
| 2 | TRANSMISSION BEAM PATTERN |
| 3 | CSI |
| 4 | SR |
| 5 | BSR |
| 6 | TCP ACK/SYC |
| 7 | ACK |

FIG. 12

| DELAY TOLERANT SIGNAL INSTRUCTION INFORMATION | GENERATED SIGNAL |
|---|---|
| 0 | NO DELAY TOLERANT SIGNAL |
| 1 | SRS |
| 2 | TRANSMISSION BEAM PATTERN |
| 3 | CSI |
| 4 | SR |
| 5 | BSR |
| 6 | TCP ACK/SYC |
| 7 | RETRANSMISSION DATA |

FIG. 13

| DELAY TOLERANT SIGNAL INSTRUCTION INFORMATION | GENERATED SIGNAL (LARGE RESOURCE SIZE) | GENERATED SIGNAL (SMALL RESOURCE SIZE) |
|---|---|---|
| 0 | NO DELAY TOLERANT SIGNAL | NO DELAY TOLERANT SIGNAL |
| 1 | SRS | SRS |
| 2 | TRANSMISSION BEAM PATTERNS (PLURALITY OF PATTERNS) | TRANSMISSION BEAM PATTERN (ONE PATTERN ONLY) |
| 3 | CSI(CQI/PMI/RI) | CSI(CQI) |
| 4 | SR | SR |
| 5 | BSR (LONG BSR) | BSR (SHORT BSR) |
| 6 | TCP ACK/SYC | TCP ACK/SYC |
| 7 | ACK (ALL) | ACK (SOME) |

FIG. 14

| DELAY TOLERANT SIGNAL INSTRUCTION INFORMATION | GENERATED SIGNAL (LARGE RESOURCE SIZE) | GENERATED SIGNAL (SMALL RESOURCE SIZE) |
|---|---|---|
| 0 | SRS | NO DELAY TOLERANT SIGNAL |
| 1 | CSI | SR |
| 2 | TRANSMISSION BEAM PATTERN | ACK |
| 3 | BSR | TCP ACK/SYC |

FIG. 15

| DELAY TOLERANT SIGNAL INSTRUCTION INFORMATION | GENERATED SIGNAL (PRIORITY LEVEL) |
|---|---|
| 0 | SR > CSI > BSR |
| 1 | TRANSMISSION BEAM PATTERN > SRS |
| 2 | BSR > SR > CSI |
| 3 | TCP ACK/SYC > RETRANSMISSION DATA |

FIG. 23

| DELAY TOLERANT SIGNAL TYPE INFORMATION | TRANSMISSION SIGNAL |
|---|---|
| 0 | NO DELAY TOLERANT SIGNAL |
| 1 | MIB |
| 2 | SIB |
| 3 | MBMS |
| 4 | DL/UL USAGE CONFIGURATION |

BASE STATION, TERMINAL, AND COMMUNICATION METHOD

TECHNICAL FIELD

The present disclosure relates to a base station, a terminal, and a communication method.

BACKGROUND ART

In downlink communication in mobile communication, generally, a base station (sometimes also referred to as an "eNB" or a "gNB") transmits, to a terminal (sometimes also referred to as "UE (user equipment)"), a control signal for the terminal to receive data. The terminal decodes control information transmitted by the received control signal, and obtains information relating to frequency assignment, adaptive control, or the like required to receive data. The base station transmits, to the terminal, downlink data (a PDSCH: physical downlink shared channel) based on adaptive control, broadcast information (a BCH: broadcast channel) for notifying cell-specific information, a reference signal for estimating a downlink propagation path (for example, a CRS: cell-specific reference signal), an MBMS (multimedia broadcast and multicast service), or the like in frequency positions notified by the control information.

Furthermore, in uplink communication in the mobile communication, generally, the base station transmits, to the terminal, a control signal for the terminal to transmit data. The terminal decodes control information transmitted by the received control signal, and obtains information relating to frequency assignment, adaptive control, or the like required to transmit data. The terminal generates data in accordance with the decoded control information, and transmits, to the base station, uplink data (a PUSCH: physical uplink shared channel), a response signal (an ACK/NACK) indicating an error detection result for downlink data, channel quality information (channel state information), an SRS (sounding reference signal) that is a reference signal for estimating an uplink propagation path, an SR (scheduling request) that requests the assignment of an uplink resource, or the like using an instructed radio resource. It should be noted that there is a possibility that a signal transmitted on the PUSCH includes not only voice and application data but also a higher layer control signal such as a TCP ACK/SYC (high layer signaling) or a BSR (buffer status report) or the like.

In this regard, with the spread of services using mobile broadband in recent years, data traffic in mobile communication has continued to increase exponentially, and there is a pressing need to expand data transmission capacities. Furthermore, in the future, dramatic developments are anticipated for the IoT (Internet of Things) in which all "things" are connected via the Internet. To support the diversification of services by means of the IoT, dramatic advancements are needed not only for data transmission capacities but also for various requirements such as low delay properties and communication areas (coverage). With this background, progress is being made in the technical development/standardization of the fifth-generation mobile communication system (5G), which considerably improves performance and function compared to the fourth-generation mobile communication system (4G).

LTE-Advanced which has been standardized by the 3GPP is one type of radio access technology (RAT) of 4G. In the 3GPP, in the standardization of 5G, progress is being made in the technical development of new radio access technology (NR: new RAT) that does not always have backward compatibility with LTE-Advanced.

In NR, high frequency bands are also used, and therefore consideration is being given to applying analog or digital beamforming in order to compensate for the effect of propagation path attenuation. In beamforming, in order to select an optimum beam, control has been considered in which the transmitting side continuously transmits beams having different beam directions (also referred to as beam patterns), and the receiving side feeds back information regarding the optimum beam (for example, see NPL 1).

Furthermore, in NR, as a time unit configuration (frame configuration) that realizes low delay, which is one of the required conditions of 5G, consideration is being given to a time unit of a fixed time interval (for example, one subframe, an NR subframe, or a time length that includes a fixed time length (for example, 1 ms) or a predetermined number of OFDM symbols) that includes one or more of a "downlink transmission region (DL transmission region)", a "guard region (sometimes also referred to as a non-transmission period or a gap period)", and an "uplink transmission region (UL transmission region)" (for example, see NPL 2). An operation that is carried out during this time unit is referred to as a "self-contained operation".

CITATION LIST

Patent Literature

NPL 1: R1-164013, Samsung, "Framework for Beamformed Access," 3GPP TSG RAN WG1 #85, May 2016

NPL 2: R1-166027, Qualcomm, Panasonic, NTT DOCOMO, KT Corp, MediaTek, Intel, "WF on Frame Structure and Evaluation," 3GPP TSG RAN WG1 #85, May 2016

NPL 3: R1-165887, LG Electronics, Panasonic, Qualcomm, NTT DOCOMO, "WF on Minimum HARQ Timing," 3GPP TSG RAN WG1 #85, May 2016

NPL 4: R1-165886, Panasonic, Intel, Samsung, NTT DOCOMO, Qualcomm, Huawei, MediaTek, "WF on Scalable Numerology Symbol Boundary Alignment," 3GPP TSG RAN WG1 #85, May 2016

NPL 5: R1-165662, Samsung et al., "WF on NR Frame Structure", 3GPP TSG RAN WG1 #85, May 2016

SUMMARY OF INVENTION

A gap period (a gap) that is a switching point between a downlink transmission region and an uplink transmission region is provided within a time unit configuration used for a self-contained operation. The gap period is set with consideration being given to the processing time of a base station or a terminal. Thus, it is necessary to set the gap period longer as the processing times by the base station and the terminal increase, and the utilization efficiency of radio resources deteriorates.

Thus, an aspect of the present disclosure provides a base station, a terminal, and a communication method with which it is possible to suppress a decline in the utilization efficiency of radio resources caused by gap periods within a time unit in which a self-contained operation is carried out.

A base station according to an aspect of the present disclosure is provided with: a transmitter that transmits a downlink signal in a downlink transmission region, in a time unit that includes the downlink transmission region, an uplink transmission region, and a gap period that is a switching point between the downlink transmission region and the uplink transmission region; and a receiver that receives an uplink signal in the uplink transmission region, in the time unit, in which a delay tolerant signal for which a delay is tolerated more than for the downlink signal and the uplink signal is mapped to within the gap period.

A terminal according to an aspect of the present disclosure is provided with: a receiver that receives a downlink signal in a downlink transmission region, in a time unit that includes the downlink transmission region, an uplink transmission region, and a gap period that is a switching point between the downlink transmission region and the uplink transmission region; and a transmitter that transmits an uplink signal in the uplink transmission region, in the time unit, in which a delay tolerant signal for which a delay is tolerated more than for the downlink signal and the uplink signal is mapped to within the gap period.

It should be noted that general or specific aspects hereof may be realized by a system, a method, an integrated circuit, a computer program, or a recording medium, and may be realized by an arbitrary combination of a system, a device, a method, an integrated circuit, a computer program, and a recording medium.

According to an aspect of the present disclosure, it is possible to suppress a decline in the utilization efficiency of radio resources caused by gap periods within a time unit in which a self-contained operation is carried out.

Additional benefits and advantages in an aspect of the present disclosure will be made apparent from the specification and figures. The benefits and/or advantages may each be provided by several of the embodiments and the features disclosed in the specification and figures, and need not all be provided in order to obtain one or more of the same features.

BRIEF DESCRIPTION OF DRAWINGS

FIG. 11 is a drawing depicting an example of delay tolerant signal instruction information according to embodiment 1.

FIG. 12 is a drawing depicting an example of delay tolerant signal instruction information according to embodiment 1.

FIG. 13 is a drawing depicting an example of delay tolerant signal instruction information according to embodiment 1.

FIG. 14 is a drawing depicting an example of delay tolerant signal instruction information according to embodiment 1.

FIG. 15 is a drawing depicting an example of delay tolerant signal instruction information according to embodiment 1.

FIG. 23 is a drawing depicting an example of delay tolerant signal instruction information according to embodiment 3.

DESCRIPTION OF EMBODIMENTS

[Circumstances Leading to the Present Disclosure]

First, the circumstances leading to the present disclosure will be described.

Consideration is being given to a "DL data self-contained" operation for realizing low delay in downlink communication, and a "UL data self-contained" operation for realizing low delay in uplink communication, using the aforementioned time unit.

In a DL data self-contained operation, a base station transmits a control signal (a DL assignment or a DL grant) that is required for a terminal to receive downlink data, and downlink data (DL data) assigned by means of the control signal, in a downlink transmission region. The terminal then transmits a response signal for the downlink data and an uplink control signal (a UCI: uplink control indicator) in an uplink transmission region.

Furthermore, in a UL data self-contained operation, the base station transmits a control signal (a UL assignment or a UL grant) that is required for the terminal to transmit uplink data, in a downlink transmission region. The terminal then transmits uplink data (UL data) assigned by means of the control signal and a UCI, in an uplink transmission region.

Furthermore, in NR, as a time unit configuration that realizes low delay, it is necessary for the time interval from the transmission of a response signal to the transmission of retransmission data to also be reduced as much as possible (for example, see NPL 3).

Furthermore, in NR, similar to a subframe of LTE, it has been agreed that a time unit configuration that includes 14 symbols (OFDM symbols) per 1 ms with a subcarrier interval of 15 kHz is to be considered as a basis (for example, see NPL 4).

Figure 1A:
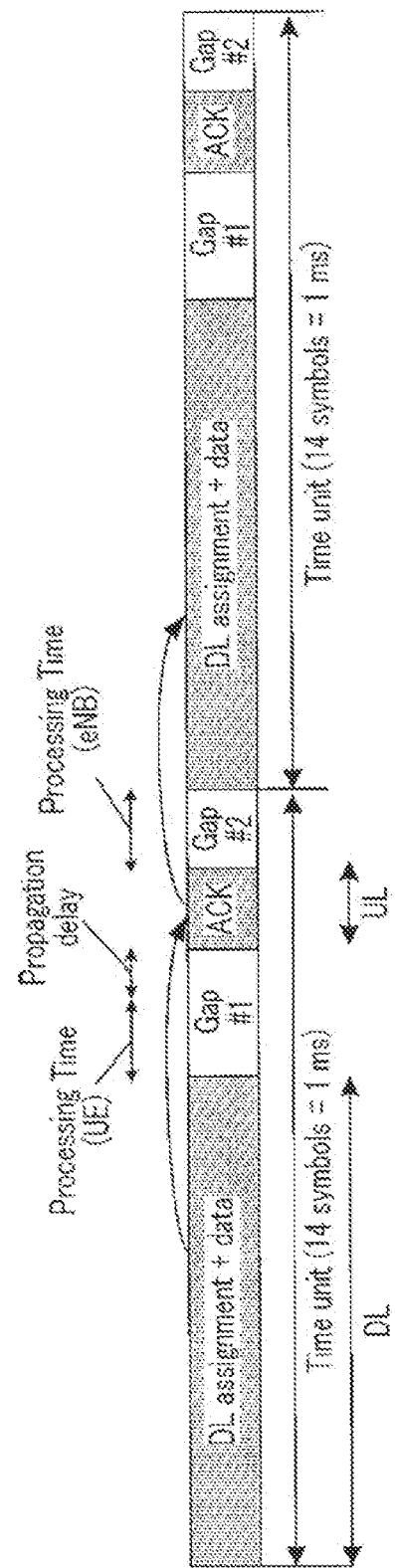
FIG. 1A is a drawing depicting an exemplary time unit configuration during a DL data self-contained operation.
Figure 1B:
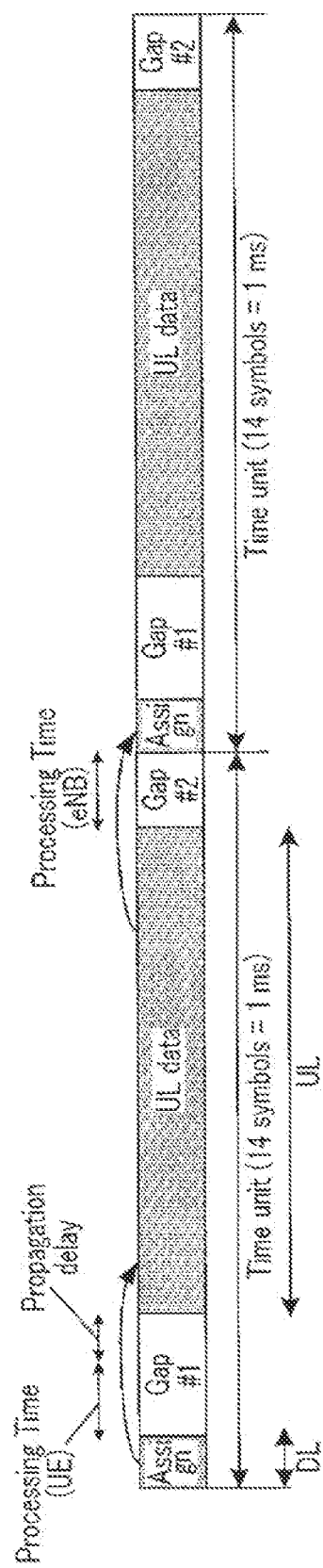
FIG. 1B is a drawing depicting an exemplary time unit configuration during a UL data self-contained operation.

As a time unit configuration that enables a self-contained operation in a TDD (time division duplex) system, consideration is being given to the configurations depicted in FIG. 1A and FIG. 1B (for example, see NPL 3). FIG. 1A depicts a time unit configuration that enables a DL data self-contained operation, and FIG. 1B depicts a time unit configuration that enables a UL data self-contained operation.

A gap period (the gap arranged first within each time unit of 1 ms in FIG. 1A and FIG. 1B; hereinafter, referred to as "gap #1") between a downlink transmission region (the period depicted as "DL" in FIG. 1A and FIG. 1B) and an uplink transmission region (the period depicted as "UL" in FIG. 1A and FIG. 1B) is set with consideration being given to a propagation delay time between the base station and the terminal and the processing time of the terminal (UE processing time). It should be noted that there is a possibility of the length of the gap period changing in a dynamic or semi-static manner (for example, see NPL 5). Here, the processing time of the terminal indicates the processing time for the terminal to decode downlink data (DL data) and generate a response signal (an ACK in FIG. 1A and FIG. 1B) in the case of a DL data self-contained operation, and indicates the processing time for the terminal to decode a control signal (a UL assignment) and generate UL data in the case of a UL data self-contained operation.

Furthermore, a gap period (the gap arranged second within each time unit of 1 ms in FIG. 1A and FIG. 1B; hereinafter referred to as "gap #2") at the end of a time unit, after the uplink transmission region, is set with consideration being given to the processing time of the base station (eNB processing time). Here, the processing time of the base station indicates the processing time for the base station to decode a response signal and generate scheduling for the next time unit and a control signal (a DL assignment) in the case of a DL data self-contained operation, and indicates the processing time for the base station to decode UL data and generate scheduling for the next time unit and a control signal (a UL assignment) in the case of a UL data self-contained operation.

In the time unit configurations of FIG. 1A and FIG. 1B, a gap period for which consideration has been given to the processing time of the base station is provided at the end of a time unit, thereby enabling data retransmission in the next time unit, and therefore a delay in data communication can be reduced.

However, in the time unit configurations for the self-contained operations depicted in FIG. 1A and FIG. 1B, there are a plurality of gap periods. Therefore, it is necessary to set the gap periods to increase as the processing times of the base station and the terminal increase, and therefore the utilization efficiency of radio resources deteriorates.

Thus, an aspect of the present disclosure provides a base station that can suppress a decline in the utilization efficiency of radio resources caused by gap periods, by transmitting a signal/channel for which a delay is tolerated (hereinafter, referred to as a "delay tolerant signal"), at the end of a downlink transmission region or an uplink transmission region within a time unit, in a case where a self-contained operation is employed.

Hereinafter, embodiments of the present disclosure will be described in detail with reference to the drawings.

Embodiment 1

[Overview of Communication System]

A communication system that carries out a DL data self-contained operation according to the present embodiment is provided with a base station 100 and a terminal 200. Furthermore, a communication system that carries out a UL data self-contained operation according to each embodiment of the present disclosure is provided with a base station 300 and a terminal 400.

It should be noted that, hereinafter, a description will be given based on the premise of a TDD system. However, an aspect of the present disclosure can be similarly applied also as an FDD system as described hereinafter.

Furthermore, one base station may have the configurations of both the base station 100 and the base station 300, or may have the configuration of either one. Similarly, one terminal may have the configurations of both the terminal 200 and the terminal 400, or may have the configuration of either one.

Figure 2:
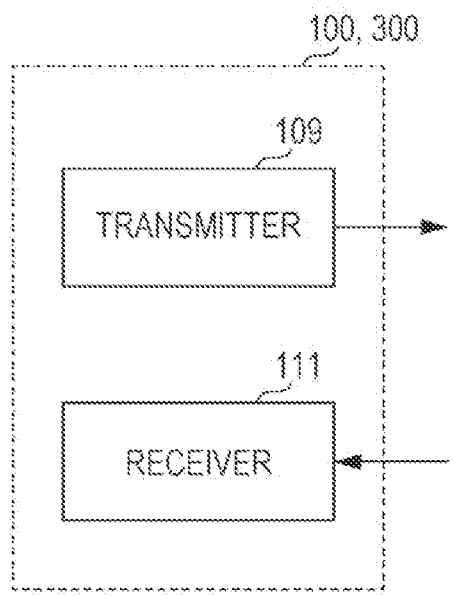
FIG. 2 is a block diagram depicting a main configuration of a base station according to embodiment 1.

FIG. 2 is a block diagram depicting a main configuration of the base stations 100 and 300 according to each embodiment of the present disclosure. In the base stations 100 and 300 depicted in FIG. 2, a transmitter 109 transmits a downlink signal in a downlink transmission region, in a time unit that includes the downlink transmission region, an uplink transmission region, and a gap period that is a switching point between the downlink transmission region and the uplink transmission region. A receiver 111 receives an uplink signal in the uplink transmission region, in the time unit. Furthermore, a delay tolerant signal for which a delay is tolerated more than for the downlink signal and the uplink signal is mapped to within the gap period.

Figure 3:
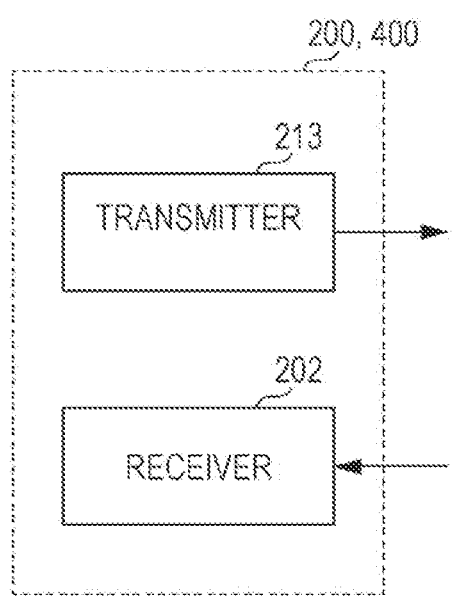
FIG. 3 is a block diagram depicting a main configuration of a terminal according to embodiment 1.

FIG. 3 is a block diagram depicting a main configuration of the terminals 200 and 400 according to each embodiment of the present disclosure. In the terminals 200 and 400 depicted in FIG. 3, a receiver 202 receives a downlink signal in a downlink transmission region, in a time unit that includes a downlink transmission region, an uplink transmission region, and a gap period that is a switching point between the downlink transmission region and the uplink transmission region. A transmitter 213 transmits an uplink signal in the uplink transmission region, in the time unit. A delay tolerant signal for which a delay is tolerated more than for the downlink signal and the uplink signal is mapped to within the gap period.

[Configuration of Base Station (During DL Data Self-Contained Operation)]

Figure 4:
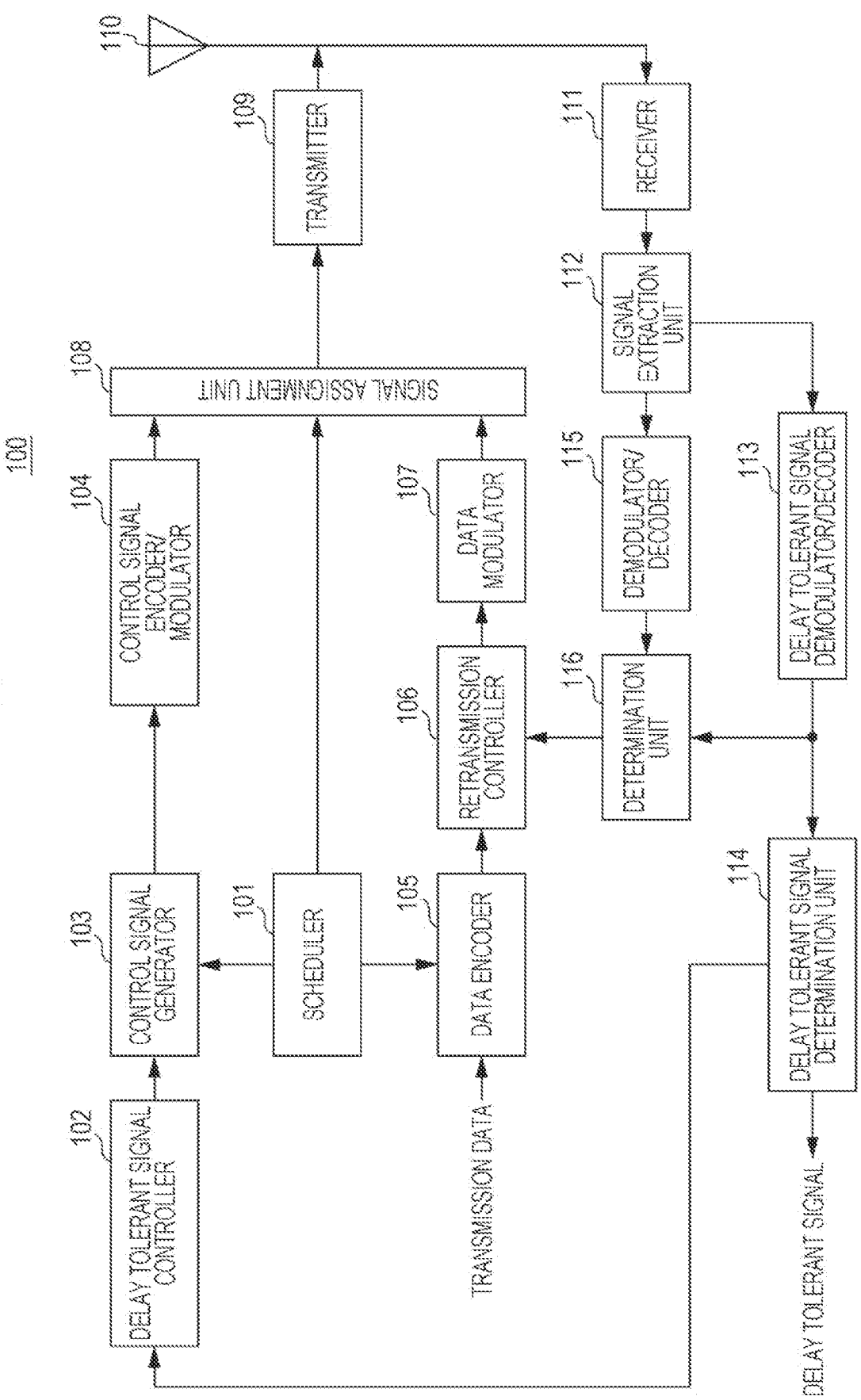
FIG. 4 is a block diagram depicting a configuration of a base station during a DL data self-contained operation according to embodiment 1.

FIG. 4 is a block diagram depicting a configuration of the base station 100 that carries out a DL data self-contained operation according to the present embodiment. In FIG. 4, the base station 100 has a scheduler 101, a delay tolerant signal controller 102, a control signal generator 103, a control signal encoder/modulator 104, a data encoder 105, a retransmission controller 106, a data modulator 107, a signal assignment unit 108, the transmitter 109, an antenna 110, the receiver 111, a signal extraction unit 112, a delay tolerant signal demodulator/decoder 113, a delay tolerant signal determination unit 114, a demodulator/decoder 115, and a determination unit 116.

The base station 100 depicted in FIG. 4 transmits a downlink signal that includes a control signal (a DL assignment) or downlink data (DL data) in a downlink transmission region of a time unit (DL data self-contained time unit) that includes the "downlink transmission region", an "uplink transmission region", and a "gap period". Furthermore, the base station 100 receives an uplink signal that includes a response signal (and may also include a delay tolerant signal or a UCI) that is transmitted from the terminal 200 in the uplink transmission region of the time unit.

In the base station 100, the scheduler 101 determines scheduling information (for example, the ID of an assigned terminal, assigned resource information for the terminal 200 (a frequency, a time, and a coding resource), data demodulation reference signal information, a modulation/encoding scheme, assigned resource information for a response signal (a frequency, a time, and a coding resource), or the like) relating to a delay tolerant signal (described hereinafter), a control signal (a DL assignment), and downlink data (DL data) in the time unit, with respect to the terminal 200. The scheduler 101 outputs the determined scheduling information to the control signal generator 103, the data encoder 105, and the signal assignment unit 108.

The delay tolerant signal controller 102 determines information regarding a signal (for example, the signal type) that is generated as a delay tolerant signal, which is a signal or a channel that is transmitted from the terminal 200 at the end of an uplink transmission region within a time unit, and outputs information indicating the determined content to the control signal generator 103. The delay tolerant signal is, for example, a signal or a channel for which a delay is tolerated more than for a downlink signal that is transmitted in a downlink transmission region and an uplink signal that is transmitted in an uplink transmission region within a time unit. Furthermore, a signal for which a delay is tolerated is, for example, a signal for which it is not necessary to carry out reception/decoding processing or the like by the time unit that is subsequent to the time unit in which the signal has been transmitted. It should be noted that the details of the delay tolerant signal that is transmitted at the end of an uplink transmission region within a time unit will be described hereinafter.

Furthermore, the delay tolerant signal controller 102 outputs information indicating that the transmission of the delay tolerant signal is a retransmission, to the control signal generator 103 in a case where the delay tolerant signal is a retransmission signal, on the basis of information indicating a delay tolerant signal reception error, which is input from the delay tolerant signal determination unit 114.

The control signal generator 103 generates a control signal (a DL assignment) for the terminal 200 on the basis of information that is input from each of the scheduler 101 and the delay tolerant signal controller 102. Control signals include a signal of a cell-specific higher layer, a signal of a group or RAT-specific higher layer, a signal of a terminal-specific higher layer, assigned resource information for downlink data, assigned resource information for a delay tolerant signal, information instructing the transmission of a delay tolerant signal (hereinafter, referred to as "delay tolerant signal instruction information"), assigned resource information for a response signal, or the like. An assigned resource for a delay tolerant signal is assumed to be at the end of an uplink transmission region within a time unit (namely, the gap period at the end of a time unit). Furthermore, in a case where the base station 100 requests the terminal 200 for the retransmission of a delay tolerant signal, the control signal generator 103 may include retransmission request information for a delay tolerant signal in the delay tolerant signal instruction information. The control signal generator 103 generates a control information bit string using such control information, and outputs the generated control information bit string to the control signal encoder/modulator 104. It should be noted that the details of the delay tolerant signal instruction information will be described hereinafter.

It should be noted that assigned resource information for a delay tolerant signal may be notified in advance by means of a higher layer notification from the base station 100 to the terminal 200. In this case, assigned resource information for a delay tolerant signal is not included in a control signal (a DL assignment).

The control signal encoder/modulator 104 encodes and modulates the control signal (a bit string) received from the control signal generator 103, and outputs a modulated control signal to the signal assignment unit 108.

The data encoder 105 carries out error correction encoding on transmission data (downlink data) in accordance with an encoding scheme received from the scheduler 101, and outputs an encoded data signal to the retransmission controller 106.

The retransmission controller 106, at the time of the first transmission, retains the encoded data signal received from the data encoder 105 and also outputs the encoded data signal to the data modulator 107. Furthermore, the retransmission controller 106, at the time of a retransmission, controls the retained data on the basis of a determination result (an ACK/NACK) from the determination unit 116. Specifically, the retransmission controller 106, upon receiving a NACK with respect to the data signal, outputs the corresponding retained data to the data modulator 107. Furthermore, the retransmission controller 106, upon receiving an ACK with respect to the data signal, discards the corresponding retained data and ends the transmission of downlink data.

The data modulator 107 modulates a data signal received from the retransmission controller 106, and outputs a modulated data signal (symbol string) to the signal assignment unit 108.

The signal assignment unit 108 maps a control signal received from the control signal encoder/modulator 104 and a data signal received from the data modulator 107 to a radio resource instructed from the scheduler 101. The signal assignment unit 108 outputs a downlink signal for which signal mapping has been carried out, to the transmitter 109.

The transmitter 109 carries out RF (radio frequency) processing such as D/A (digital-to-analog) conversion and up-conversion on the signal received from the signal assignment unit 108, and transmits a radio signal to the terminal 200 via the antenna 110.

The receiver 111 carries out RF processing such as down-conversion or A/D (analog-to-digital) conversion with respect to the signal waveform of an uplink from the terminal 200 received via the antenna 110, and outputs an obtained reception signal to the signal extraction unit 112.

The signal extraction unit 112 extracts a radio resource portion in which an uplink response signal from the terminal 200 has been transmitted, from the reception signal, and outputs a reception response signal to the demodulator/decoder 115. Furthermore, the signal extraction unit 112 extracts a radio resource portion in which a delay tolerant signal from the terminal 200 has been transmitted, from the reception signal, and outputs the delay tolerant signal to the delay tolerant signal demodulator/decoder 113.

The delay tolerant signal demodulator/decoder 113 carries out equalization, demodulation, and error correction decoding for the delay tolerant signal that is input from the signal extraction unit 112, and outputs a decoded bit sequence to the determination unit 116 and the delay tolerant signal determination unit 114.

The delay tolerant signal determination unit 114 determines whether or not the delay tolerant signal (a bit sequence) that is input from the delay tolerant signal demodulator/decoder 113 has been correctly received. The delay tolerant signal determination unit 114, when having determined that the delay tolerant signal has been correctly received, outputs the delay tolerant signal. However, the delay tolerant signal determination unit 114, when having determined that the delay tolerant signal has not been correctly received and is a signal for which it is necessary to request a retransmission of the delay tolerant signal, outputs information indicating a reception error for the delay tolerant signal to the delay tolerant signal controller 102.

The demodulator/decoder 115 carries out equalization, demodulation, and decoding on the reception response signal that is received from the signal extraction unit 112, and outputs a decoded bit sequence to the determination unit 116.

The determination unit 116 determines whether a response signal for downlink data, transmitted from the terminal 200, indicates an ACK or NACK with respect to the downlink data, on the basis of the bit sequence that is input from the demodulator/decoder 115. It should be noted that the determination unit 116 may carry out the determination for the response signal with consideration also being given to a bit sequence (for example, some or all of the response signal) that is input from the delay tolerant signal demodulator/decoder 113. The determination unit 116 outputs a determination result (an ACK or NACK) to the retransmission controller 106.

[Configuration of Terminal (During DL Data Self-Contained Operation)]

Figure 5:
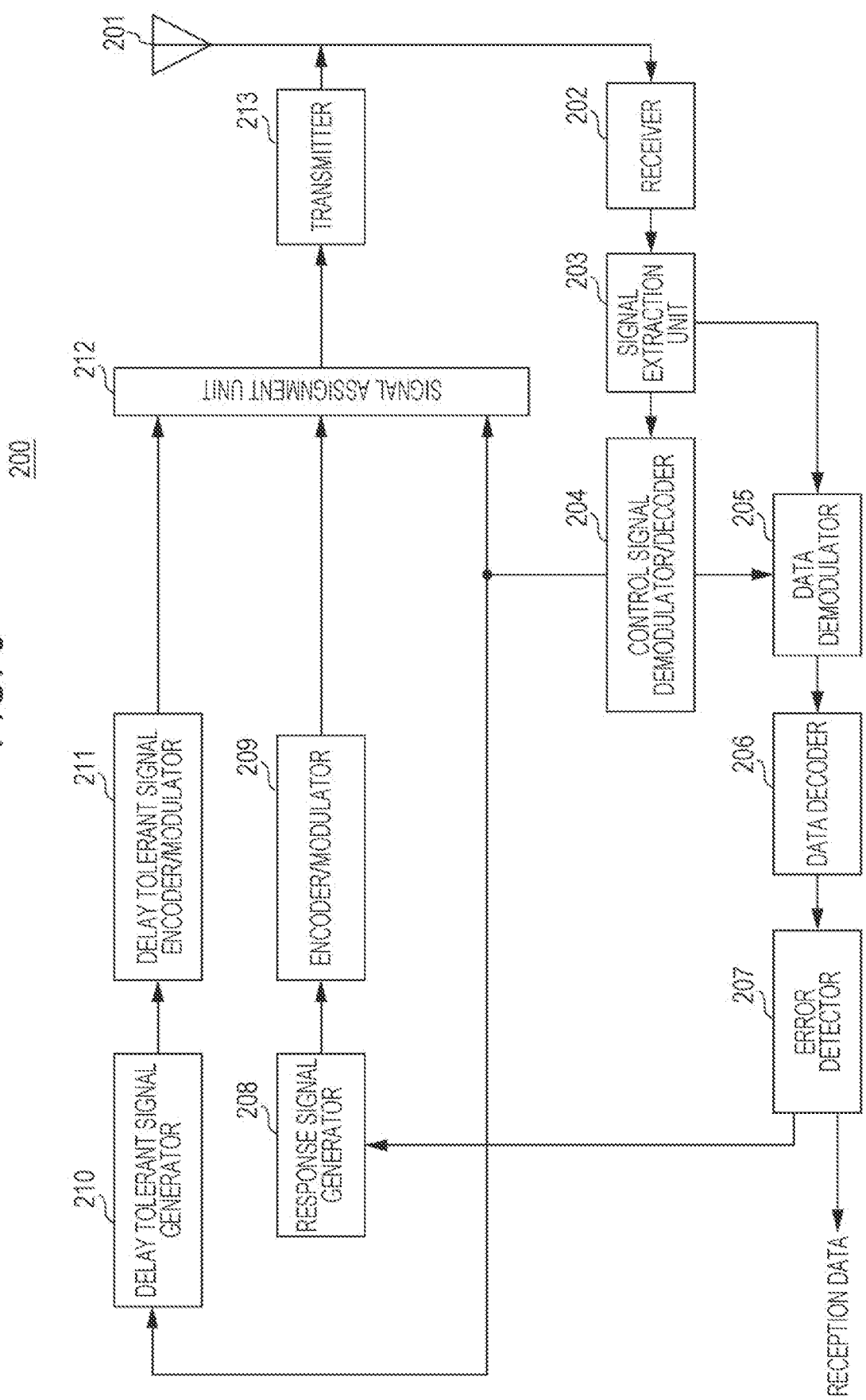
FIG. 5 is a block diagram depicting a configuration of a terminal during a DL data self-contained operation according to embodiment 1.

FIG. 5 is a block diagram depicting a configuration of the terminal 200 that carries out a DL data self-contained operation according to the present embodiment. In FIG. 5, the terminal 200 has an antenna 201, the receiver 202, a signal extraction unit 203, a control signal demodulator/decoder 204, a data demodulator 205, a data decoder 206, an error detector 207, a response signal generator 208, an encoder/modulator 209, a delay tolerant signal generator 210, a delay tolerant signal encoder/modulator 211, a signal assignment unit 212, and the transmitter 213.

The terminal 200 depicted in FIG. 5 receives a downlink signal that includes a control signal (a DL assignment) or downlink data (DL data) transmitted from the base station 100 in a downlink transmission region of a time unit (self-contained time unit) that includes the "downlink transmission region", a "gap period", and an "uplink transmission region". Furthermore, the terminal 200 transmits an uplink signal that includes a response signal for downlink data (and may also include a delay tolerant signal or a UCI), in the uplink transmission region of the time unit.

In the terminal 200, the receiver 202 receives, via the antenna 201, a control signal and downlink data transmitted from the base station 100, carries out RF processing such as down-conversion or AD conversion with respect to a radio reception signal, and obtains a baseband signal. The receiver 202 outputs the baseband signal to the signal extraction unit 203.

The signal extraction unit 203 extracts a signal portion that includes the control signal, from the baseband signal received from the receiver 202, and outputs the signal portion to the control signal demodulator/decoder 204. Furthermore, the signal extraction unit 203 extracts a signal portion that includes the downlink data from the baseband signal, and outputs the signal portion to the data demodulator 205.

The control signal demodulator/decoder 204 carries out blind decoding on the control signal received from the signal extraction unit 203, and attempts decoding for a control signal addressed thereto. The control signal demodulator/decoder 204, when having determined as a result of the blind decoding that the control signal is a control signal addressed thereto, outputs assigned resource information for downlink data included in the control signal (the ID of an assigned terminal, assigned resource information (a frequency, a time, and a coding resource), data demodulation reference signal information, a modulation/encoding scheme, or the like) to the data demodulator 205, outputs assigned resource information for a response signal and assigned resource information for a delay tolerant signal to the signal assignment unit 212, and outputs delay tolerant signal instruction information to the delay tolerant signal generator 210.

The data demodulator 205 demodulates downlink data received from the signal extraction unit 203, on the basis of the assigned resource information for downlink data, received from the control signal demodulator/decoder 204, and outputs demodulated downlink data to the data decoder 206.

The data decoder 206 decodes the downlink data received from the data demodulator 205, and outputs decoded downlink data to the error detector 207.

The error detector 207 carries out error detection by means of a CRC, for example, with respect to the downlink data received from the data decoder 206, and outputs an error detection result (an ACK or NACK) to the response signal generator 208. Furthermore, the error detector 207 outputs, as reception data, downlink data determined as having no errors as a result of the error detection.

The response signal generator 208, using the error detection result (an ACK or NACK) received from the error detector 207, generates a response signal (a bit sequence) for the received downlink data, and outputs the response signal to the encoder/modulator 209.

The encoder/modulator 209 carries out error correction encoding on the response signal (a bit sequence) received from the response signal generator 208, modulates an encoded bit sequence, and outputs a modulated symbol sequence to the signal assignment unit 212.

The delay tolerant signal generator 210 generates a delay tolerant signal on the basis of delay tolerant signal instruction information that has been input from the control signal demodulator/decoder 204, information that is predetermined by the system, information that is preset in the terminal 200 by means of a higher layer notification from the base station 100, or the like. The delay tolerant signal generator 210 outputs the generated delay tolerant signal (a bit sequence) to the delay tolerant signal encoder/modulator 211. Furthermore, the delay tolerant signal generator 210 determines whether the transmission of the delay tolerant signal is the first transmission or a retransmission on the basis of whether or not retransmission request information is included in the delay tolerant signal instruction information that is input from the control signal demodulator/decoder 204. The delay tolerant signal generator 210 retains the delay tolerant signal at the time of the first transmission, and outputs a corresponding retained signal to the delay tolerant signal encoder/modulator 211 at the time of a retransmission.

The delay tolerant signal encoder/modulator 211 carries out encoding processing and modulation processing on the bit sequence that is input from the delay tolerant signal generator 210, and outputs a modulated delay tolerant signal to the signal assignment unit 212.

The signal assignment unit 212 maps a signal received from the encoder/modulator 209 and a signal received from the delay tolerant signal encoder/modulator 211 to a resource (a time, a frequency, and a coding resource) within a time unit for a self-contained operation, instructed from the control signal demodulator/decoder 204. It should be noted that a radio resource to which a delay tolerant signal is mapped may be notified in advance by means of a higher layer notification from the base station 100 to the terminal 200 without notification being performed by means of a control signal (a DL assignment).

The transmitter 213 carries out RF processing such as D/A conversion and up-conversion on the signal received from the signal assignment unit 212, and transmits a radio signal to the base station 100 via the antenna 201.

[Configuration of Base Station (During UL Data Self-Contained Operation)]

Figure 6:
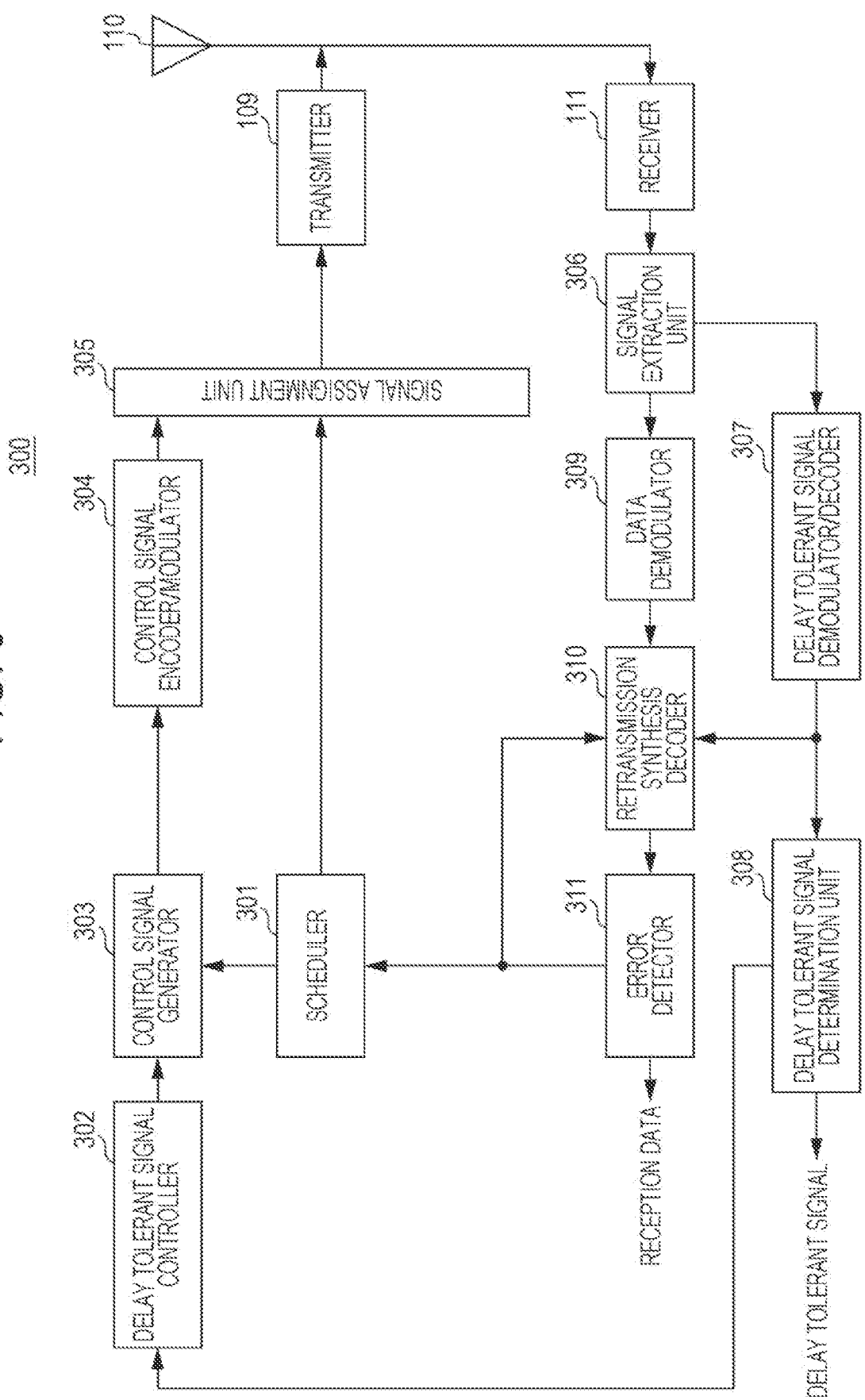
FIG. 6 is a block diagram depicting a configuration of a base station during a UL data self-contained operation according to embodiment 1.

FIG. 6 is a block diagram depicting a configuration of the base station 300 that carries out a UL data self-contained operation according to the present embodiment. In FIG. 6, the base station 300 has a scheduler 301, a delay tolerant signal controller 302, a control signal generator 303, a control signal encoder/modulator 304, a signal assignment unit 305, the transmitter 109, the antenna 110, the receiver 111, a signal extraction unit 306, a delay tolerant signal demodulator/decoder 307, a delay tolerant signal determination unit 308, a data demodulator 309, a retransmission synthesis decoder 310, and an error detector 311.

The base station 300 depicted in FIG. 6 transmits a downlink signal that includes a UL assignment in a downlink transmission region of a time unit (UL data self-contained time unit) that includes the "downlink transmission region", a "gap period", and an "uplink transmission region". Furthermore, the base station 300 receives an uplink signal that includes uplink data (and may also include a delay tolerant signal or a UCI) that has been transmitted from the terminal 400 in the uplink transmission region of the time unit.

In the base station 300, the scheduler 301 schedules the retransmission of uplink data in a case where an error detection result indicating that there is an error in the previous uplink data is input from the error detector 311. Furthermore, the scheduler 301 schedules a new packet for the terminal 400 in a case where an error detection result indicating that there are no errors in the previous uplink data is input from the error detector 311.

For example, the scheduler 301 determines scheduling information (for example, the ID of an assigned terminal, assigned resource information for the terminal 400 (a frequency, a time, and a coding resource), data demodulation reference signal information, a modulation/encoding scheme for uplink data, or the like) relating to a delay tolerant signal, a control signal (a UL assignment), and uplink data (UL data) in a time unit, with respect to the terminal 400. The scheduler 301 outputs the determined scheduling information to the control signal generator 303 and the signal assignment unit 305.

The delay tolerant signal controller 302 determines information (for example, the type of delay tolerant signal) relating to a signal that is generated as a delay tolerant signal, which is a signal or a channel that is transmitted from the terminal 400 at the end of an uplink transmission region within a time unit, and outputs information indicating the determined content to the control signal generator 303. It should be noted that the details of the delay tolerant signal that is transmitted at the end of an uplink transmission region within a time unit will be described hereinafter.

Furthermore, the delay tolerant signal controller 302 outputs information indicating that the transmission of the delay tolerant signal is a retransmission, to the control signal generator 303 in a case where the delay tolerant signal is a retransmission signal, on the basis of information indicating a delay tolerant signal reception error, which is input from the delay tolerant signal determination unit 308.

The control signal generator 303 generates a control signal (a UL assignment) for the terminal 400 on the basis of information that is input from each of the scheduler 301 and the delay tolerant signal controller 302. Control signals include a signal of a cell-specific higher layer, a signal of a group or RAT-specific higher layer, a signal of a terminal-specific higher layer, assigned resource information for uplink data, information instructing a retransmission or a new transmission of uplink data, assigned resource information for a delay tolerant signal, delay tolerant signal instruction information, or the like. Furthermore, in a case where the base station 300 requests the terminal 400 for the retransmission of a delay tolerant signal, the control signal generator 303 may include retransmission request information for a delay tolerant signal in the delay tolerant signal instruction information. The control signal generator 303 generates a control information bit string using such control information, and outputs the control information bit string to the control signal encoder/modulator 304. It should be noted that the details of the delay tolerant signal instruction information will be described hereinafter.

It should be noted that assigned resource information for a delay tolerant signal may be notified in advance by means of a higher layer notification from the base station 300 to the terminal 400. In this case, assigned resource information for a delay tolerant signal is not included in a control signal (a UL assignment).

The control signal encoder/modulator 304 encodes and modulates a control signal received from the control signal generator 303, and outputs a modulated control signal to the signal assignment unit 305.

The signal assignment unit 305 maps a control signal received from the control signal encoder/modulator 304 to a radio resource (an assigned time/frequency/coding resource) instructed from the scheduler 301. The signal assignment unit 305 outputs a downlink signal for which signal mapping has been carried out, to the transmitter 109.

The transmitter 109, the antenna 110, and the receiver 111 operate in a manner similar to the transmitter 109, the antenna 110, and the receiver 111 provided in the base station 100.

The signal extraction unit 306 extracts a radio resource portion in which uplink data from the terminal 400 has been transmitted, from a reception signal that is input from the receiver 111, and outputs the radio resource portion to the data demodulator 309. Furthermore, the signal extraction unit 306 extracts a radio resource portion in which a delay tolerant signal from the terminal 400 has been transmitted, from the reception signal, and outputs the delay tolerant signal to the delay tolerant signal demodulator/decoder 307.

The delay tolerant signal demodulator/decoder 307 carries out equalization, demodulation, and error correction decoding for the delay tolerant signal that is input from the signal extraction unit 306, and outputs a decoded bit sequence to the delay tolerant signal determination unit 308 and the retransmission synthesis decoder 310.

The delay tolerant signal determination unit 308 determines whether or not the delay tolerant signal (a bit sequence) that is input from the delay tolerant signal demodulator/decoder 307 has been correctly received. The delay tolerant signal determination unit 308, when having determined that the delay tolerant signal has been correctly received, outputs the delay tolerant signal. However, the delay tolerant signal determination unit 308, when having determined that the delay tolerant signal has not been correctly received and is a signal for which it is necessary to request a retransmission of the delay tolerant signal, outputs information indicating a reception error for the delay tolerant signal, to the delay tolerant signal controller 302.

The data demodulator 309 carries out equalization and demodulation processing on uplink data received from the signal extraction unit 306, and outputs demodulated uplink data (a bit sequence) to the retransmission synthesis decoder 310.

The retransmission synthesis decoder 310, in a case where uplink data to be decoded of the terminal 400 is retained (a case where the uplink data is retransmission data), synthesizes the retained uplink data and uplink data that has been output from the data demodulator 309, and carries out decoding processing on the synthesized uplink data. The retransmission synthesis decoder 310, in a case where uplink data of the terminal 400 is not retained (a case where the uplink data is the first packet), carries out decoding processing without carrying out synthesis processing for uplink data. It should be noted that the retransmission synthesis decoder 310 may carry out retransmission synthesis and decoding processing with consideration also being given to a bit sequence (for example, some or all of the uplink data) that is input from the delay tolerant signal demodulator/decoder 307. The retransmission synthesis decoder 310 then outputs decoded uplink data to the error detector 311. Furthermore, the retransmission synthesis decoder 310, in a case where a detection result from the error detector 311 indicates that there are no errors, deletes the retained uplink data of the terminal 400.

The error detector 311 carries out error detection by means of a CRC, for example, with respect to uplink data received from the retransmission synthesis decoder 310, and outputs an error detection result (an ACK or NACK) to the scheduler 301 and the retransmission synthesis decoder 310.

Furthermore, the error detector 311 outputs, as reception data, uplink data determined as having no errors as a result of the error detection.

[Configuration of Terminal (During UL Data Self-Contained Operation)]

Figure 7:
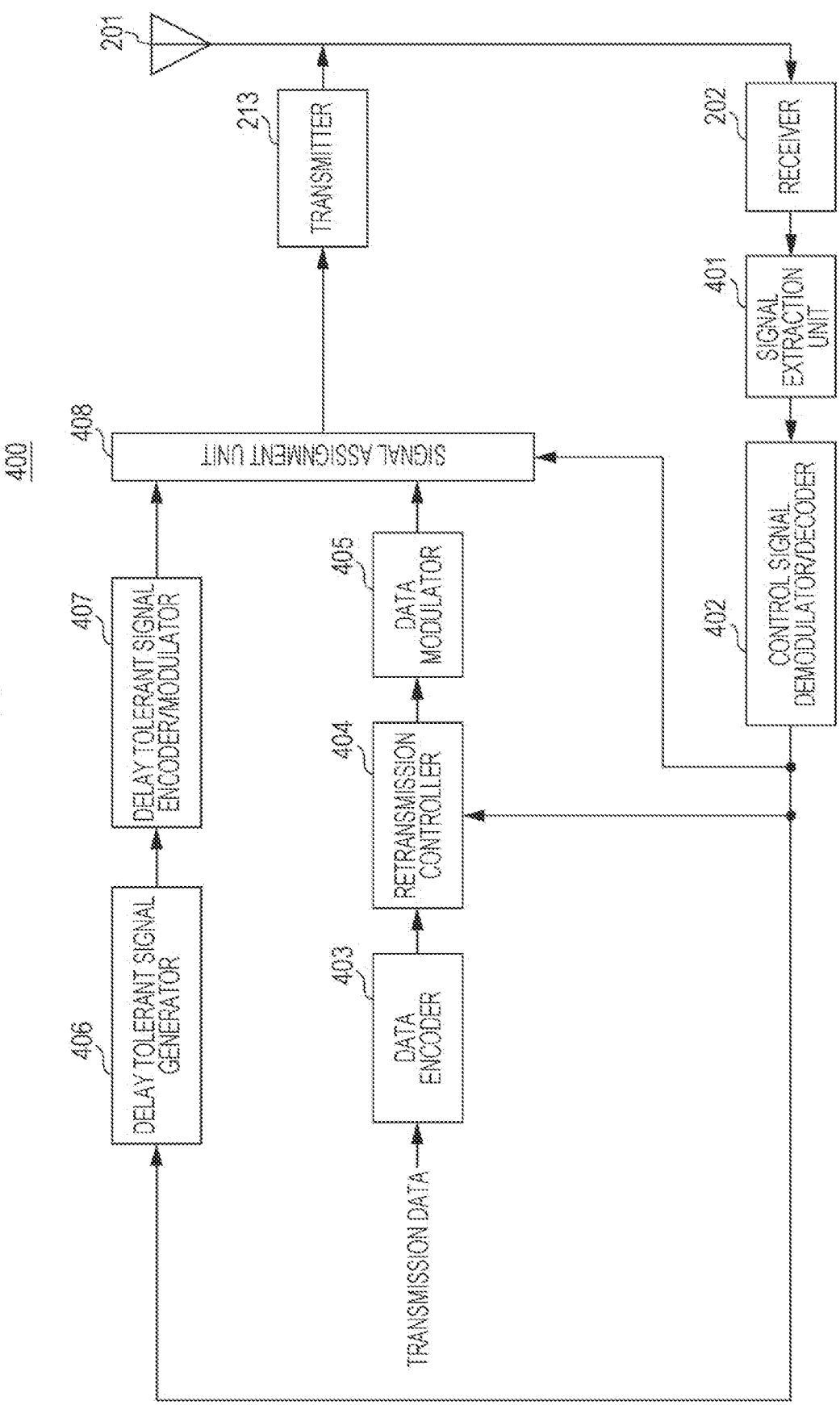
FIG. 7 is a block diagram depicting a configuration of a terminal during a UL data self-contained operation according to embodiment 1.

FIG. 7 is a block diagram depicting a configuration of the terminal 400 that carries out a UL data self-contained operation according to the present embodiment. In FIG. 7, the terminal 400 has the antenna 201, the receiver 202, a signal extraction unit 401, a control signal demodulator/decoder 402, a data encoder 403, a retransmission controller 404, a data modulator 405, a delay tolerant signal generator 406, a delay tolerant signal encoder/modulator 407, a signal assignment unit 408, and the transmitter 213.

The terminal 400 depicted in FIG. 7 receives a downlink signal that includes a control signal (a UL assignment) transmitted from the base station 300 in a downlink transmission region of a time unit (UL data self-contained time unit) that includes the "downlink transmission region", a "gap period", and an "uplink transmission region". Furthermore, the terminal 400 transmits an uplink signal that includes uplink data (and may also include a delay tolerant signal or a UCI) in the uplink transmission region of the time unit.

In the terminal 400, the antenna 201 and the receiver 202 operate in a manner similar to the antenna 201 and the receiver 202 provided in the terminal 200.

The signal extraction unit 401 extracts a control signal from a baseband signal received from the receiver 202, and outputs the control signal to the control signal demodulator/decoder 402.

The control signal demodulator/decoder 402 carries out blind decoding on the control signal received from the signal extraction unit 401, and attempts decoding for a control signal addressed thereto. The control signal demodulator/decoder 402, when having determined as a result of the blind decoding that the control signal is a control signal addressed thereto, outputs, to the signal assignment unit 408, assigned resource information for uplink data (the ID of an assigned terminal, assigned resource information (a frequency, a time, and a coding resource), data demodulation reference signal information, a modulation/encoding scheme, or the like) and assigned resource information for a delay tolerant signal, included in the control signal, outputs information instructing a retransmission or a new transmission of uplink data to the retransmission controller 404, and outputs delay tolerant signal instruction information to the delay tolerant signal generator 406.

The data encoder 403 carries out error correction encoding on transmission data (uplink data), and outputs an encoded data signal to the retransmission controller 404.

The retransmission controller 404 determines whether or not the uplink data is the first packet or a retransmission packet on the basis of information received from the control signal demodulator/decoder 402. In the case of the first packet, the retransmission controller 404 retains the encoded uplink data received from the data encoder 403 and also outputs the encoded uplink data to the data modulator 405. Furthermore, in the case of the first packet, the retransmission controller 404 determines that the transmission and reception of the previous transmission packet has been successful and discards the retained data. However, in the case of a retransmission packet, the retransmission controller 404 outputs the corresponding retained data to the data modulator 405.

The data modulator 405 modulates the uplink data received from the retransmission controller 404, and outputs modulated uplink data to the signal assignment unit 408.

The delay tolerant signal generator 406 generates a delay tolerant signal on the basis of delay tolerant signal instruction information that has been input from the control signal demodulator/decoder 402, information that is predetermined by the system, information that is preset in the terminal 400 by means of a higher layer notification from the base station 300, or the like. The delay tolerant signal generator 406 outputs the generated delay tolerant signal (a bit sequence) to the delay tolerant signal encoder/modulator 407. Furthermore, the delay tolerant signal generator 406 determines whether the transmission of the delay tolerant signal is the first transmission or a retransmission on the basis of whether or not retransmission request information is included in the delay tolerant signal instruction information that is input from the control signal demodulator/decoder 402. The delay tolerant signal generator 406 retains the delay tolerant signal at the time of the first transmission, and outputs a corresponding retained signal to the delay tolerant signal encoder/modulator 407 at the time of a retransmission.

The delay tolerant signal encoder/modulator 407 carries out encoding processing and modulation processing on the bit sequence that is input from the delay tolerant signal generator 406, and outputs a modulated delay tolerant signal to the signal assignment unit 408.

The signal assignment unit 408 maps uplink data received from the data modulator 405 and a delay tolerant signal received from the delay tolerant signal encoder/modulator 407 to a resource (a time, a frequency, and a coding resource) within a time unit for a self-contained operation, instructed from the control signal demodulator/decoder 402. The signal assignment unit 408 outputs an uplink signal for which signal mapping has been carried out, to the transmitter 213.

The transmitter 213 operates in a manner similar to the transmitter 213 provided in the terminal 200.

[Operation of Base Stations 100 and 300 and Terminals 200 and 400]

A detailed description will be given regarding an operation in the base stations 100 and 300 and the terminals 200 and 400 having the above configurations.

Figure 8:
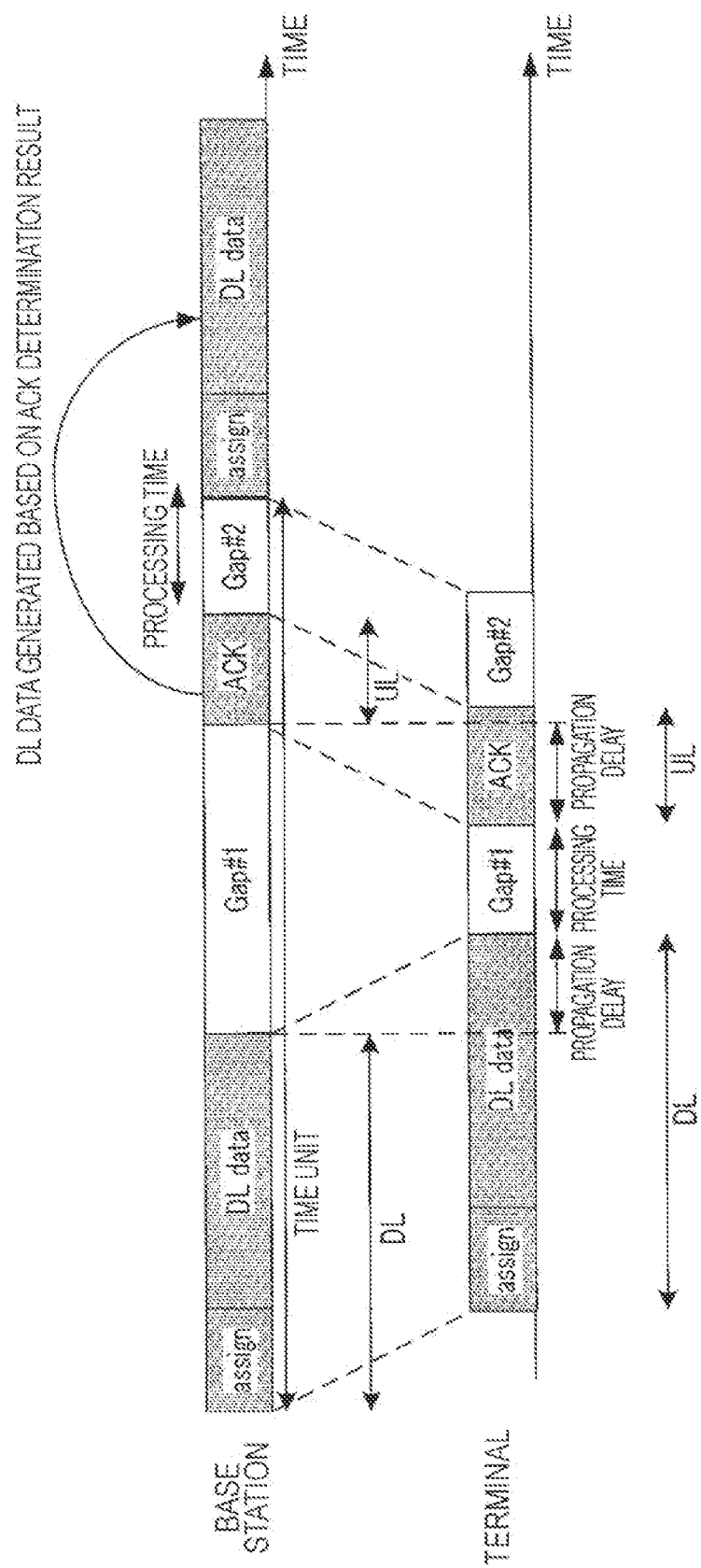
FIG. 8 is a drawing depicting an example of a transmission sequence in a base station and a terminal during a DL data self-contained operation.

FIG. 8 depicts an example of a transmission sequence in each of a base station (eNB) and a terminal (UE) during the DL data self-contained operation of FIG. 1A. Furthermore, FIG. 9 depicts an example of a transmission sequence in each of the base station 100 and the terminal 200 during the DL data self-contained operation according to the present embodiment.

In FIG. 8, in each time unit, gap #1 that takes into consideration a propagation delay time and the processing time of the terminal is arranged between a downlink transmission region and an uplink transmission region (at the end of the downlink transmission region), and gap #2 that takes into consideration the processing time of the base station is arranged after the uplink transmission region (at the end of the uplink transmission region). For example, the base station schedules downlink data that is transmitted in the downlink transmission region of the next time unit, on the basis of a determination result for a response signal (depicted as an ACK in FIG. 8) received in the uplink transmission region, in the period of gap #2 depicted in FIG. 8.

Figure 9:
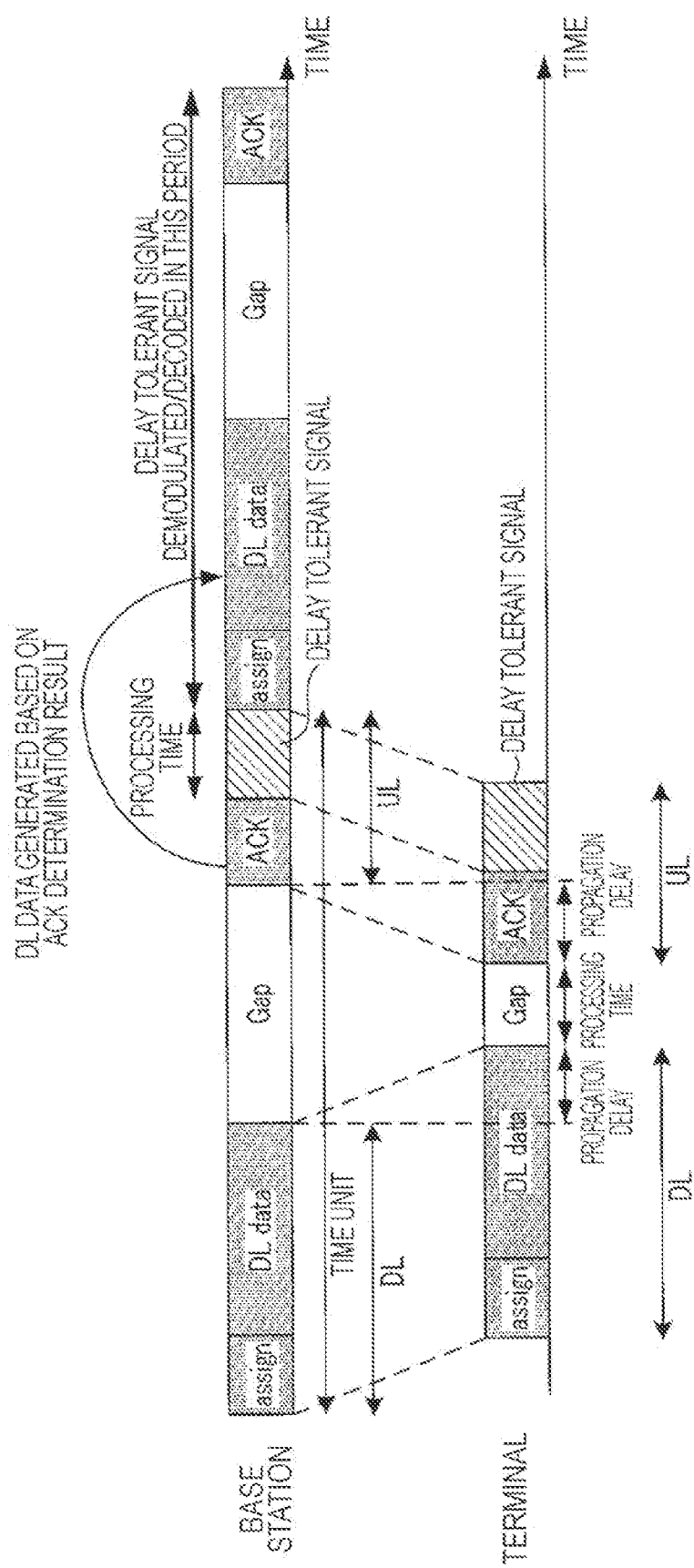
FIG. 9 is a drawing depicting an example of a transmission sequence in a base station and a terminal during a DL data self-contained operation according to embodiment 1.

However, in the present embodiment, as depicted in FIG. 9, in a DL data self-contained operation, a delay tolerant signal, for which a delay can be tolerated more than for a response signal (uplink signal) or uplink data (UL data) that is mapped in the uplink transmission region, is mapped to within gap #2 that is arranged at the end of the uplink transmission region depicted in FIG. 8, that is, within a period that takes into consideration the processing time of the base station 100.

That is, the terminal 200 transmits a delay tolerant signal that has been mapped to a period corresponding to gap #2 arranged after the uplink transmission region, and the base station 100 receives the delay tolerant signal that has been mapped to the period corresponding to gap #2 arranged after the uplink transmission region.

In this case also, the base station 100, upon receiving the response signal (ACK) in the uplink transmission region, can schedule downlink data that is transmitted in the downlink transmission region of the next time unit, on the basis of a determination result for the response signal, in a transmission period for a delay tolerant signal (corresponding to gap #2 in FIG. 8).

Furthermore, the base station 100, upon receiving the delay tolerant signal transmitted from the terminal 200 at the end of the uplink transmission region, carries out predetermined processing (demodulation/decoding processing or the like) on the delay tolerant signal. However, as mentioned above, a delay tolerant signal is a signal for which it is not always necessary to carry out reception/decoding processing or the like by the time unit that is subsequent to the time unit in which the delay tolerant signal has been received by the base station 100. That is, since a delay is tolerated for a delay tolerant signal, the base station 100, for example, can carry out demodulation/decoding processing for a delay tolerant signal in a period corresponding to the next time unit.

It should be noted that, although FIG. 9 relates to during a DL data self-contained operation, in a UL data self-contained operation it is also sufficient to similarly configure a time unit in which a delay tolerant signal is mapped to a period corresponding to gap #2 depicted in FIG. 1B.

It is thereby possible to reduce the overhead for gaps while maintaining the average delay time from a transmission buffer for the base station 100 being generated to the base station 100 receiving a response signal to downlink data from the terminal 200, and the average delay time from a transmission buffer for the terminal 400 being generated to the terminal 400 completing transmission of the first uplink data.

It should be noted that it is not always necessary for the terminals 200 and 400 to transmit a delay tolerant signal in each time unit. In a case where the terminal 200 does not transmit a delay tolerant signal, the time resource for a delay tolerant signal (the end of an uplink transmission region) becomes a gap period as in FIG. 1A and FIG. 1B. It is thereby possible to reduce power consumption by not carrying out excessive transmissions.

[Types of Delay Tolerant Times]

Next, the types of delay tolerant times that are generated in the delay tolerant signal generators 210 and 406 of the terminals 200 and 400 will be described in detail.

Hereinafter, descriptions will be given regarding the types of delay tolerant signals common to the DL data self-contained operation and the UL data self-contained operation (common delay tolerant signal types), the type of delay tolerant signal that is generated in only the DL data self-contained operation (a DL data self-contained operation delay tolerant signal type), and the type of delay tolerant signal that is generated in only the UL data self-contained operation (a UL data self-contained operation delay tolerant signal type).

First, common delay tolerant signal types 1 to 6 will be described.

<Common Delay Tolerant Signal Type 1>

A delay tolerant signal in common delay tolerant signal type 1 is a reference signal (an SRS: sounding reference signal) for estimating a propagation path for an uplink.

An SRS has no effect on the retransmission control of downlink data or uplink data even if the base stations 100 and 300 do not complete reception/decoding processing by the next time unit. That is, an SRS is a signal for which a delay can be tolerated compared to a response signal or uplink data transmitted in an uplink transmission region.

In this way, due to the terminals 200 and 400 transmitting an SRS in a gap period (gap #2) at the end of an uplink transmission region, in addition to the aforementioned effects, it is possible to increase the opportunities for the base stations 100 and 300 to estimate a propagation path for an uplink. Therefore, channel estimation accuracy for an uplink improves, and uplink throughput can be improved. It should be noted that, in the case of a TDD system, a channel estimation value estimated from a propagation path for an uplink using an SRS can be applied also to a downlink, and therefore downlink throughput can also be improved.

<Common Delay Tolerant Signal Type 2>

A delay tolerant signal in common delay tolerant signal type 2 is information indicating a plurality of beam patterns.

Specifically, the terminals 200 and 400 transmit a reference signal including at least one of a plurality of beam patterns as a delay tolerant signal. The base stations 100 and 300 then detect the optimum beam pattern in an uplink from among the beam patterns corresponding to the reference signals transmitted from the terminals 200 and 400.

A beam pattern has no effect on the retransmission control of downlink data or uplink data even if the base stations 100 and 300 do not complete reception/decoding processing by the next time unit. That is, a beam pattern is a signal for which a delay can be tolerated compared to a response signal or uplink data transmitted in an uplink transmission region.

In this way, due to the terminals 200 and 400 transmitting a reference signal for a predetermined beam pattern in a gap period (gap #2) at the end of an uplink transmission region, in addition to the aforementioned effects, it is possible to increase the opportunities for the base stations 100 and 300 to estimate the optimum beam pattern for an uplink. Therefore, beam pattern estimation accuracy for an uplink improves, and uplink throughput can be improved.

<Common Delay Tolerant Signal Type 3>

A delay tolerant signal in common delay tolerant signal type 3 is CSI, which is channel quality information of a downlink.

CSI includes one or more out of a CQI (channel quality indicator), a PMI (precoding matrix indicator), an RI (rank indicator), and a CRI (CSI-RS resource indicator).

CSI has no effect on the retransmission control of downlink data or uplink data even if the base stations 100 and 300 do not complete reception/decoding processing by the next time unit. That is, CSI is a signal for which a delay can be tolerated compared to a response signal or uplink data transmitted in an uplink transmission region.

In this way, due to the terminals 200 and 400 transmitting CSI in a gap period (gap #2) at the end of an uplink transmission region, in addition to the aforementioned effects, it is possible to increase the opportunities for the terminals 200 and 400 to notify quality information of a downlink to the base stations 100 and 300. Therefore, the accuracy of adaptive modulation for a downlink improves, and downlink throughput can be improved.

<Common Delay Tolerant Signal Type 4>

A delay tolerant signal in common delay tolerant signal type 4 is a scheduling request (SR) with which the assignment of a radio resource for an uplink is requested.

An SR has no effect on the retransmission control of downlink data or uplink data even if the base stations 100 and 300 do not complete reception/decoding processing by the next time unit. That is, an SR is a signal for which a delay can be tolerated compared to a response signal or uplink data transmitted in an uplink transmission region.

In this way, due to the terminals 200 and 400 transmitting an SR in a gap period (gap #2) at the end of an uplink transmission region, in addition to the aforementioned effects, it becomes possible for the terminals 200 and 400 to notify a resource assignment request for an uplink to the base stations 100 and 300 at an early timing. Uplink throughput therefore improves.

<Common Delay Tolerant Signal Type 5>

A delay tolerant signal in common delay tolerant signal type 5 is a BSR (buffer status report) that notifies a buffer state of the terminals 200 and 400.

A BSR is any of a regular BSR that is notified when data is generated, a periodic BSR that is transmitted periodically, and a padding BSR that is transmitted in a case where the number of redundant bits of a MAC PDU (medium access control protocol data unit) is greater than the number of bits required for storage.

A BSR has no effect on the retransmission control of downlink data or uplink data even if the base stations 100 and 300 do not complete reception/decoding processing by the next time unit. That is, a BSR is a signal for which a delay can be tolerated compared to a response signal or uplink data transmitted in an uplink transmission region.

In this way, due to the terminals 200 and 400 transmitting a BSR in a gap period (gap #2) at the end of an uplink transmission region, in addition to the aforementioned effects, the terminals 200 and 400 can notify a buffer state to the base stations 100 and 300 at an early timing. Therefore, the timing at which scheduling for uplink data is carried out becomes earlier, and uplink throughput improves.

<Common Delay Tolerant Signal Type 6>

A delay tolerant signal in common delay tolerant signal type 6 is a TCP ACK/SYC.

A TCP ACK is a higher layer notification for notifying a base station that the reception of a signal of a TCP (transmission control protocol) layer has been completed. Furthermore, a TCP SYC is a higher layer notification for a terminal to notify a base station when a connection is established with a TCP layer.

A TCP ACK/SYC has no effect on the retransmission control of downlink data or uplink data even if the base stations 100 and 300 do not complete reception/decoding processing by the next time unit. That is, a TCP ACK/SYC is a signal for which a delay can be tolerated compared to a response signal or uplink data transmitted in an uplink transmission region.

It should be noted that since a TCP ACK/SYC is a higher layer notification, there is a possibility of the terminals 200 and 400 not being able to determine whether or not the signal in question is a TCP ACK/SYC in a MAC/PHY layer. In this case, the terminals 200 and 400 may determine that the signal in question is a TCP ACK/SYC in a case where the size of the signal in question is small (for example, a case where the signal size is less than a predetermined value).

Furthermore, a retransmission for a TCP ACK/SYC transmitted as a delay tolerant signal may be carried out or may not be carried out. In a case where a TCP ACK/SYC is to be retransmitted, the terminals 200 and 400 are not able to retransmit the TCP ACK/SYC in the next time unit, but a problem does not arise since the TCP ACK/SYC is a signal for which a delay is tolerated as mentioned above.

In this way, the terminals 200 and 400 transmit a TCP ACK in a gap period (gap #2) at the end of an uplink transmission region. Thus, in addition to the aforementioned effects, it becomes possible for a TCP ACK to be fed back at an early timing, in a slow start phase in which the number of TCP segments in TCP congestion control is increased exponentially. The TCP layer throughput can therefore be improved. Furthermore, by transmitting a TCP SYC, a TCP connection can be established at an early timing, and TCP layer throughput can be improved.

Hereinabove, common delay tolerant signal types 1 to 6 have been described.

<DL Data Self-Contained Delay Tolerant Signal Type>

Next, a description will be given regarding a DL data self-contained delay tolerant signal type with which a performance improvement or the like can be expected due to a transmission being carried out in a DL data self-contained operation.

A delay tolerant signal in the DL data self-contained delay tolerant signal type is some or all of the delay tolerant signal and a response signal (ACK) that has already been transmitted in the same time unit.

Figure 10:
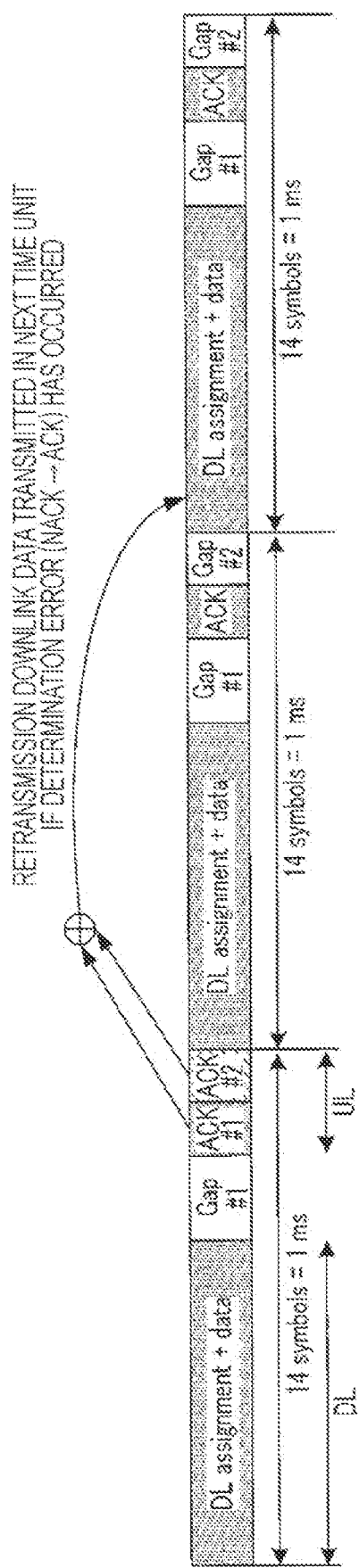
FIG. 10 is a drawing depicting an example of a transmission sequence in a case where a delay tolerant signal is a response signal according to embodiment 1.

FIG. 10 is a drawing depicting an example of a transmission sequence in a case where the terminal 200 transmits a response signal as a delay tolerant signal.

A response signal (ACK #2 depicted in FIG. 10) that is transmitted as a delay tolerant signal is transmitted in a period (the processing time of the base station) corresponding to gap #2 in FIG. 1A. Therefore, there is a high possibility of it being difficult to demodulate/decode ACK #2 within the processing time of the base station 100 (that is, by the next time unit).

Meanwhile, a response signal (ACK #1 depicted in FIG. 10) that is transmitted in an uplink transmission region can be demodulated/decoded within the processing time of the base station 100. However, in a case where the base station 100 makes an error in the determination of the receiving of ACK #1 and determines a NACK as an ACK, a retransmission packet is not transmitted to the terminal 200, and therefore a packet timeout occurs and a large delay occurs.

In order to prevent this determination error, the base station 100 (the determination unit 116 depicted in FIG. 4) synthesizes ACK #2 transmitted as a delay tolerant signal and ACK #1 transmitted in the same time unit. The base station 100 (determination unit 116) then determines whether or not there is a determination error for the response signal on the basis of the synthesized response signal. In this way, the reception quality for a response signal improves due to the synthesizing, and therefore the reception determination accuracy for a response signal can be improved. For example, as depicted in FIG. 10, the processing of the base station 100 is carried out in the period of the time unit that is subsequent to the time unit in which a response signal (ACK #1 or ACK #2) has been transmitted. Then, the base station 100, when having determined that there has been a determination error for the response signal, additionally transmits retransmission data in the next time unit. Thus, a delay for a retransmission packet can be suppressed to one time unit, and a large delay occurring can be prevented.

As mentioned above, some or all of a response signal transmitted as a delay tolerant signal has no effect on the retransmission control of downlink data or uplink data even if the base station 100 does not complete reception/decoding processing by the next time unit. That is, some or all of a response signal transmitted as a delay tolerant signal is a signal for which a delay can be tolerated compared to a response signal that is transmitted in another uplink transmission region.

In this way, the terminal 200 transmits some or all of a response signal transmitted in the same time unit in a gap period (gap #2) at the end of an uplink transmission region. Thus, in addition to the aforementioned effects, the possibility of a determination error for a response signal occurring in the base station 100 can be reduced, and downlink throughput can be improved.

<UL Data Self-Contained Delay Tolerant Signal Type>

Next, a description will be given regarding a UL data self-contained delay tolerant signal type with which a performance improvement or the like can be expected due to a transmission being carried out in a UL data self-contained operation.

A delay tolerant signal in the UL data self-contained delay tolerant signal type is the delay tolerant signal and uplink data that has already been transmitted in the same time unit.

In a case where an IR (incremental redundancy) scheme is applied in retransmission control, uplink data is transmitted with an RV (redundancy version), which indicates a transmission start position in an encoded data sequence, being altered in accordance with the number of times transmission has been carried out. Some of the uplink data transmitted as a delay tolerant signal may be some of a data sequence having the same RV as uplink data that has already been transmitted in the same time unit, or may be some of a data sequence having a different RV.

Some of the uplink data that is transmitted as a delay tolerant signal is transmitted in a period (the processing time of the base station) corresponding to gap #2 in FIG. 1B. Therefore, there is a high possibility of it being difficult to demodulate/decode within the processing time of the base station 300 (that is, by the next time unit). Therefore, uplink data that is transmitted as a delay tolerant signal is used when uplink data that is retransmitted in the next time unit is received. That is, the base station 300 (the retransmission synthesis decoder 310 depicted in FIG. 6) synthesizes retransmission data of the uplink data, and some of the uplink data that has been received in the previous time unit as a delay tolerant signal, and decodes the synthesized data. It should be noted that the delay tolerant signal is discarded in a case where a retransmission does not occur.

Some of the uplink data transmitted as a delay tolerant signal has no effect on the retransmission control of downlink data or uplink data even if the base station 300 does not complete reception/decoding processing by the next time unit. That is, some of the uplink data transmitted as a delay tolerant signal is a signal for which a delay can be tolerated compared to uplink data that is transmitted in another uplink transmission region.

In this way, the terminal 400 transmits some of the uplink data transmitted in the same time unit in a gap period (gap #2) at the end of an uplink transmission region. Thus, in addition to the aforementioned effects, it is possible to improve the reception success probability for the next item of uplink data in the base station 300, when a retransmission has occurred.

Hereinabove, the types of delay tolerant signals have been described in detail. It should be noted that the types of delay tolerant signals are not restricted to the aforementioned signals, and it is sufficient for the types of delay tolerant signals to be signals for which a delay is tolerated in communication using a time unit configuration.

[Delay Tolerant Signal Selection Methods]

Next, methods for selecting a delay tolerant signal to be generated in the aforementioned delay tolerant signal controllers 102 and 302 of the base stations 100 and 300 will be described.

<Selection Method 1>

In selection method 1, the base stations 100 and 300 signal the type of delay tolerant signal to be generated by the terminals 200 and 400, using delay tolerant signal instruction information and using a downlink control signal (a PDCCH including a DL assignment or a UL assignment).

FIG. 11 depicts an example of delay tolerant signal instruction information during a DL data self-contained operation, and FIG. 12 depicts an example of delay tolerant signal instruction information during a UL data self-contained operation.

It should be noted that in a case where a delay tolerant signal to be transmitted does not fit within the resource that has been set, such as in a case where the size of the processing time (gap #2) of the base stations 100 and 300 is small, the base stations 100 and 300 may notify that there is no delay tolerant signal (delay tolerant signal instruction information=0).

In the terminals 200 and 400, the control signal demodulator/decoders 204 and 402 acquire notified delay tolerant signal instruction information, and the delay tolerant signal generators 210 and 406, on the basis of the delay tolerant signal instruction information, determine which delay tolerant signal is to be generated, and generate the delay tolerant signal.

In this way, the base stations 100 and 300 signal the type of delay tolerant signal to be generated, to the terminals 200 and 400 by means of a downlink control signal, and it is thereby possible to dynamically switch the information that is transmitted as a delay tolerant signal.

<Selection Method 2>

In selection method 2, similar to selection method 1, the base station 100 signals the type of delay tolerant signal to be generated by the terminal 200, using a downlink control signal. In selection method 2, in addition, the type of delay tolerant signal to be transmitted by the terminal 200 is altered in accordance with the size of the radio resource (the frequency domain or the time domain) used to transmit the delay tolerant signal.

FIG. 13 and FIG. 14 depict an example of delay tolerant signal instruction information during a DL data self-contained operation.

The delay tolerant signal instruction information depicted in FIG. 13 is an example in which, in accordance with the resource size, the type of the delay tolerant signal does not change but the content of the information that is transmitted as a delay tolerant signal changes. For example, in a case where the delay tolerant signal instruction information indicates "3" in FIG. 13, a CQI, a PMI, and an RI are transmitted as CSI constituting a delay tolerant signal when the resource size is large, whereas only a CQI is transmitted as CSI constituting a delay tolerant signal when the resource size is small.

Similarly, in a case where the delay tolerant signal instruction information indicates "5" in FIG. 13, a long BSR is transmitted as a delay tolerant signal when the resource size is large, and a short BSR is transmitted as a delay tolerant signal when the resource size is small. It should be noted that a long BSR is information that notifies the amount of data in a plurality of logical channel groups, and a short BSR is information that notifies the amount of data in one logical channel group.

Meanwhile, the delay tolerant signal instruction information depicted in FIG. 14 is an example in which the type of delay tolerant signal changes in accordance with the resource size. As depicted in FIG. 14, in a case where the resource size is small, an SR, an ACK, a TCP ACK/SYC, no delay tolerant signal, or the like constituting information having a comparatively low number of transmission bits is transmitted as a delay tolerant signal, and in a case where the resource size is large, an SRS, CSI, a transmission beam pattern, a BSR, or the like constituting information having a comparatively high number of transmission bits is transmitted as a delay tolerant signal.

It should be noted that a configuration may be adopted in which the delay tolerant signal instruction information is instructed from a higher layer, and the terminal 200 changes the delay tolerant signal to be transmitted in accordance with the resource size.

In this way, by changing the type or content of the delay tolerant signal to be transmitted, in accordance with the resource size, it becomes possible for the terminal 200 to select the type or content of a large number of delay tolerant signals with a small amount of signaling.

<Selection Method 3>

In selection method 3, the base stations 100 and 300 signal delay tolerant signal instruction information that is similar to delay tolerant signal instruction information 1 to the terminals 200 and 400 by means of a higher layer.

In this way, the base stations 100 and 300 notify the type of delay tolerant signal to be generated, to the terminals 200 and 400 by means of a higher layer notification, and it is thereby possible to reduce the overhead caused by signaling in a downlink.

<Selection Method 4>

In selection method 4, the base stations 100 and 300 notify delay tolerant signal instruction information that indicates the priority levels of delay tolerant signals to be generated, to the terminals 200 and 400 by means of a higher layer.

The terminals 200 and 400 transmit one or more transmittable delay tolerant signals on the basis of the priority levels instructed by the delay tolerant signal instruction information.

FIG. 15 depicts an example of delay tolerant signal instruction information that indicates the priority levels of delay tolerant signals to be generated by the terminals 200 and 400. For example, in a case where the delay tolerant signal instruction information indicates "0", the terminals 200 and 400 preferentially select signals to be transmitted as delay tolerant signals, in the order of an SR, CSI, and a BSR.

In this way, the base stations 100 and 300 notify the priority levels of delay tolerant signals to be generated, to the terminals 200 and 400 by means of a higher layer, and it thereby becomes possible for the terminals 200 and 400 to select the types of a large number of delay tolerant signals with a small amount of signaling. Furthermore, even in a case where a signal having a high priority level instructed by the delay tolerant signal instruction information cannot be transmitted as a delay tolerant signal, the terminals 200 and 400 can once again select a signal having a lower priority level, and can therefore select transmission signals in a flexible manner.

It should be noted that a configuration may be adopted in which the terminals 200 and 400 transmit delay tolerant signals according to priority levels that are stipulated as a specification in advance, rather than the base stations 100 and 300 notifying the priority levels of generated signals.

Hereinabove, methods for selecting delay tolerant signals have been described.

In this way, in the present embodiment, a delay tolerant signal that has no effect on the processing time of the base station is mapped to a gap period that is arranged after an uplink transmission region in a time unit (a gap period that is arranged at the end of a time unit). It is thereby possible to reduce the overhead for gap periods while ensuring the processing times of the base stations 100 and 300 in gap periods. For example, even in a case where gap periods increase in length in consideration of the processing times of the base stations 100 and 300, more assigned resources for delay tolerant signals can be ensured in proportion to the amount by which the gap periods have increased in length.

Based on the above, according to the present embodiment, it is possible to suppress a decline in the utilization efficiency of radio resources caused by gap periods within time units.

It should be noted that, in the present embodiment, in a case where the size of a resource used to transmit a delay tolerant signal is large, the base stations 100 and 300 may transmit a plurality of items of delay tolerant signal instruction information, and instruct the terminals 200 and 400 to transmit a plurality of delay tolerant signals.

Figure 16:
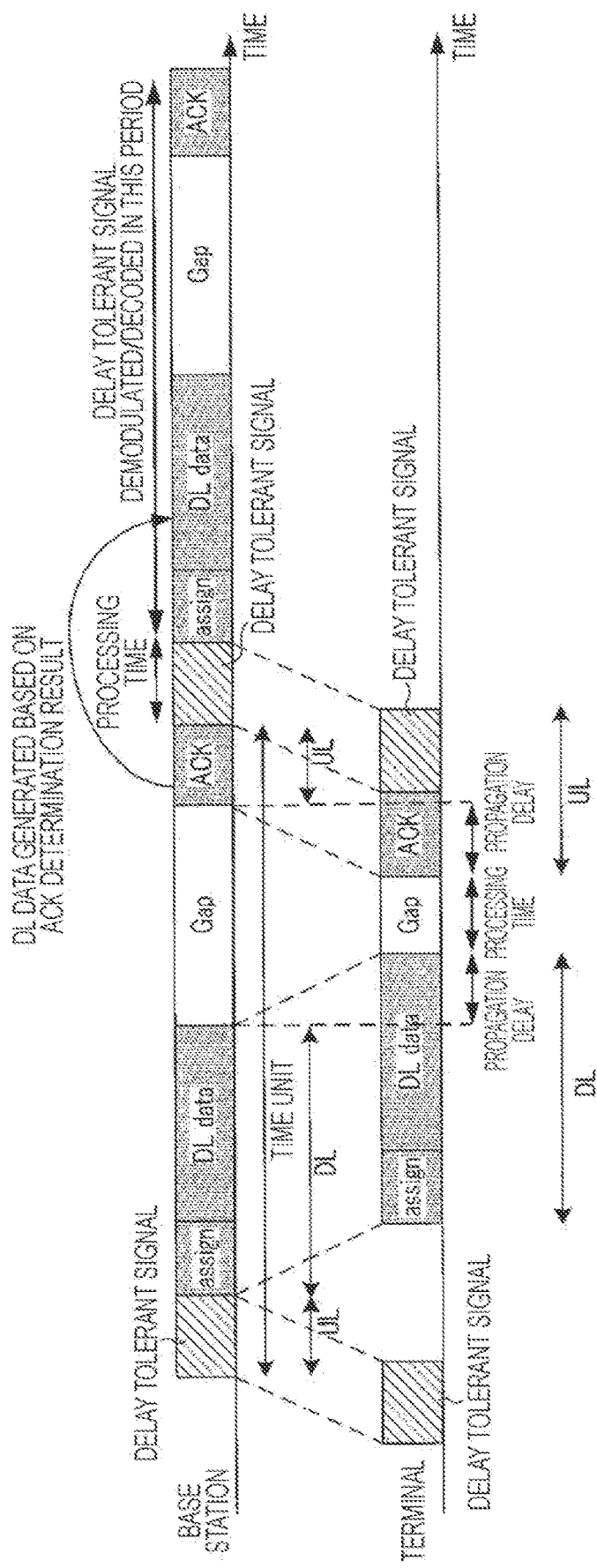
FIG. 16 is a drawing depicting an example of a transmission sequence in a base station and a terminal during a UL data self-contained operation according to embodiment 1.

Furthermore, a similar effect can be obtained even if the definition of a time unit is different from the arrangement in the exemplary time unit configuration depicted in FIG. 9, as long as the arrangement of the signals (a DL assignment, DL data, a gap, an ACK, a delay tolerant signal) within a time unit is the same. For example, the definition of a time unit may be a period from the reception of a delay tolerant signal in a base station to the reception of a response signal (an ACK), as depicted in FIG. 16. In this case, delay tolerant signals are transmitted from the terminals 200 and 400 to the base stations 100 and 300 at the beginning (an uplink transmission region) of a time unit. Thus, an effect that is similar to that of embodiment 1 (the configuration of FIG. 9) can be obtained.

Figure 17:
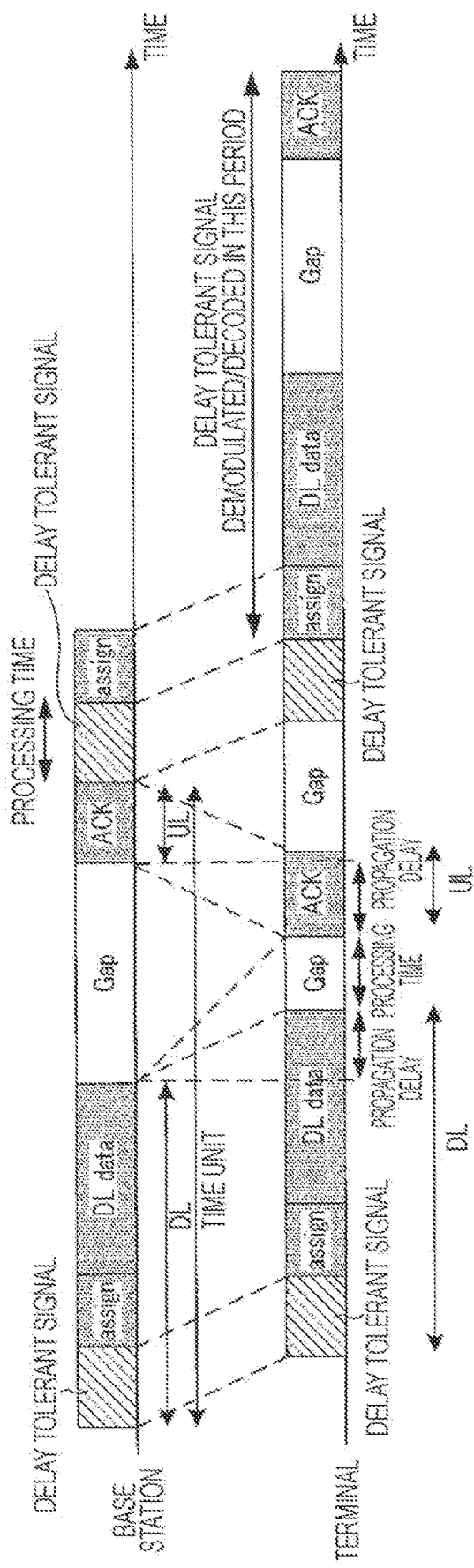
FIG. 17 is a drawing depicting an example of a transmission sequence in a base station and a terminal during a UL data self-contained operation according to embodiment 1.

Furthermore, a delay tolerant signal is not restricted to an uplink signal transmitted by the terminals 200 and 400, and may be a downlink signal transmitted by the base stations 100 and 300. For example, the base station 100 may transmit a delay tolerant signal at the beginning of a downlink transmission region, as depicted in FIG. 17. Thus, an effect that is similar to that of 1 can be obtained. It should be noted that the details of a downlink signal that is transmitted as a delay tolerant signal will be described in embodiment 3.

Embodiment 2

As described in embodiment 1, in a case where a self-contained operation is used, performance can be improved by transmitting a delay tolerant signal that has no effect on the processing time of a base station or a terminal, at the end of an uplink transmission region within a time unit. However, in embodiment 1, it is necessary for a frequency resource (assigned resource information) used to transmit the delay tolerant signal, to be notified from the base station to the terminal. Therefore, the amount of downlink control signals increases, and the overhead for control signals increases.

Thus, in the present embodiment, a method will be described in which a delay tolerant signal is transmitted without the frequency resource used to transmit the delay tolerant signal being notified by means of a downlink control signal.

It should be noted that the base station and the terminal according to the present embodiment have a basic configuration that is common to the base stations 100 and 300 and the terminals 200 and 400 according to embodiment 1, and will therefore be described with reference to FIG. 4 to FIG. 7.

In the present embodiment, the processing of the control signal generators 103 and 303 of the base stations 100 and 300 in FIG. 4 and FIG. 6 and the processing of the signal assignment units 212 and 408 of the terminals 200 and 400 in FIG. 5 and FIG. 7 are different from in embodiment 1.

Specifically, the control signal generators 103 and 303 do not generate control information that indicates a frequency resource to which a delay tolerant signal is assigned. That is, the control signal generators 103 and 303 generate assigned resource information for downlink data, uplink data, or a response signal as control information relating to a frequency resource assigned to the terminals 200 and 400.

The signal assignment units 212 and 408 determine a frequency resource (assigned band) to which a delay tolerant signal is assigned, in accordance with a frequency band (assigned band) to which a downlink control signal, downlink data, uplink data, or a response signal, transmitted in the same time unit as the delay tolerant signal, has been assigned.

Hereinafter, resource assignment methods for a delay tolerant signal in the aforementioned signal assignment units 212 and 408 of the terminals 200 and 400 will be described in detail.

First, a resource assignment method that is common to a DL data self-contained operation and a UL data self-contained operation (common resource assignment method) will be described.

<Common Resource Assignment Method>

The base stations 100 and 300 and the terminals 200 and 400 determine a frequency assignment position for a delay tolerant signal on the basis of a CCE (control channel element) index to which a downlink control signal (for example, a PDCCH that includes a DL assignment or a UL assignment) has been assigned.

Figure 18:
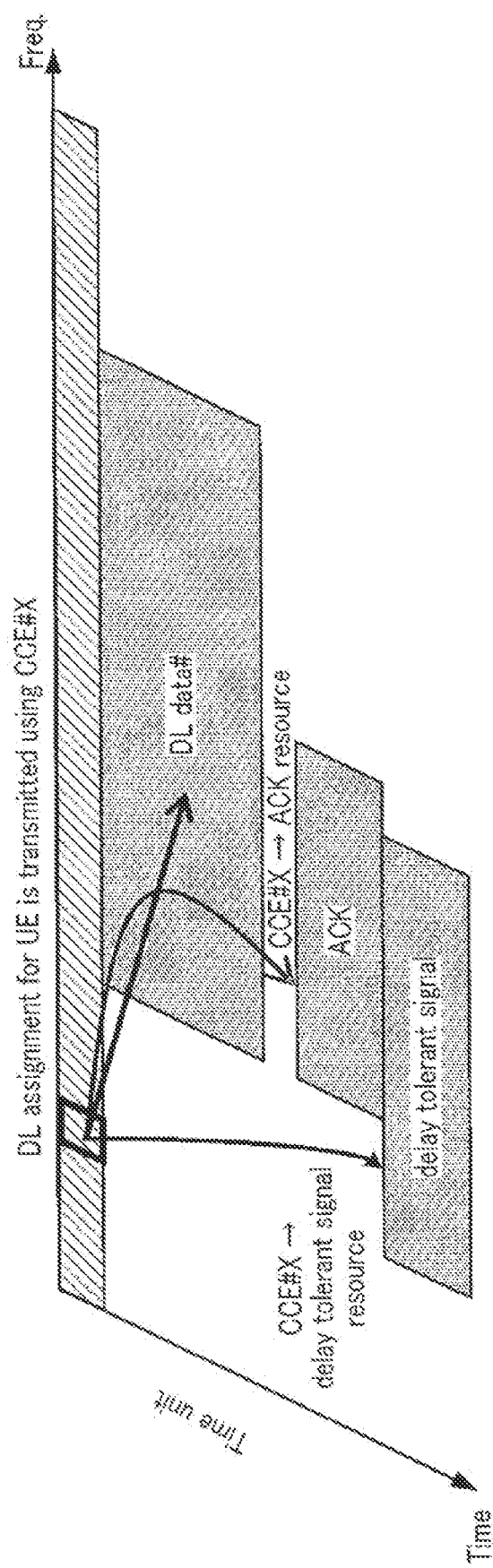
FIG. 18 is a drawing depicting an example of a resource assignment method for a delay tolerant signal according to embodiment 2.

FIG. 18 depicts an example of the assignment of a frequency resource for a delay tolerant signal (the delay tolerant signal of FIG. 18) that is based on a CCE according to the common resource assignment method.

In the example depicted in FIG. 18, during a DL data self-contained operation, an index of a CCE (downlink resource) to which a DL assignment is assigned and a frequency resource (uplink resource) to which a response signal is assigned are associated on a one-to-one basis.

In FIG. 18, in addition, the index of the CCE to which the DL assignment is assigned and a frequency resource (uplink resource) to which a delay tolerant signal is assigned are associated on a one-to-one basis.

Here, the number of CCEs, for example, is a value obtained by dividing the number of REs (resource elements) forming a downlink control signal (PDCCH) by 36 (1 CCE=36 REs). Thus, for instance, as an example of the association between CCEs and frequency assignment positions, a usable bandwidth is divided by the number of CCEs, and a usable frequency band is associated with each CCE.

The terminal 200 then transmits the delay tolerant signal which is mapped to all or some of a frequency band that is a resource associated on a one-to-one basis in relation to the delay tolerant signal with the index of the CCE (CCE #X in FIG. 18) used to transmit the DL assignment addressed thereto.

It should be noted that, although FIG. 18 depicts a DL data self-contained operation, similarly also for a UL data self-contained operation, it is sufficient for the index of a CCE used to transmit a UL assignment and a resource used to transmit a delay tolerant signal to be associated on a one-to-one basis.

In this way, a delay tolerant signal is mapped to a resource associated on a one-to-one basis with a resource (CCE index) used to transmit assignment information (a DL assignment or a UL assignment) indicating a resource assignment for data transmitted in the same time unit as the delay tolerant signal. By associating a CCE index and a resource for a delay tolerant signal, signaling for notifying a frequency resource used to transmit the delay tolerant signal is not necessary. Thus, the base stations 100 and 300 can control the frequency assignment position of a delay tolerant signal while reducing the amount of downlink control information. Furthermore, due to the base stations 100 and 300 controlling the assignment of CCEs, it becomes possible for a radio resource for a delay tolerant signal to be changed by the base stations 100 and 300.

Next, resource assignment methods during a DL data self-contained operation (DL data self-contained resource assignment methods) will be described.

<DL Data Self-Contained Resource Assignment Method 1>

The terminal 200 transmits a delay tolerant signal within a frequency band having assigned thereto a response signal, which is transmitted within the same time unit.

Figure 19:
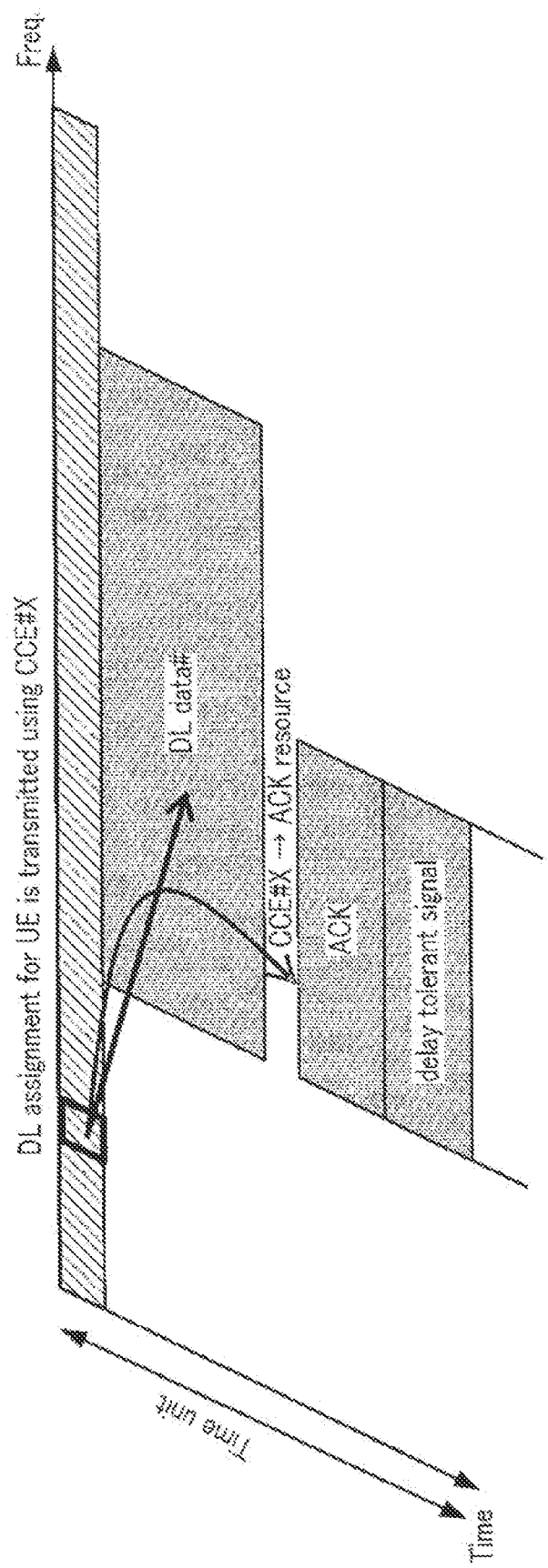
FIG. 19 is a drawing depicting an example of a resource assignment method for a delay tolerant signal according to embodiment 2.

FIG. 19 depicts an example of the assignment of a frequency resource for a response signal (ACK) and a delay tolerant signal according to DL data self-contained resource assignment method 1. In FIG. 19, the terminal 200 specifies an assigned resource (ACK resource) for a response signal associated with a CCE (CCE #X in FIG. 19) to which a DL assignment addressed thereto is associated. The terminal 200 then specifies a resource within the same frequency band as the ACK resource as the assigned resource for a delay tolerant signal.

It should be noted that, although FIG. 19 depicts an example in which the assigned resource for a delay tolerant signal is the same as for a response signal, the assigned resource for the delay tolerant signal may not be the same as long as it is within the band to which the response signal is assigned.

Furthermore, in a case where a response signal and a delay tolerant signal are mapped to a code region (OCC (orthogonal cover code) number or cyclic shift number) in a manner similar to a response signal in LTE, a configuration may be adopted in which a delay tolerant signal is transmitted in the same radio resource as an ACK code region.

In this way, a delay tolerant signal is mapped to within the same frequency band as the frequency band having assigned thereto a response signal for downlink data transmitted in the same time unit as the delay tolerant signal. By associating the frequency assignment position of the delay tolerant signal with the response signal, the amount of downlink control information can be reduced. Furthermore, since the frequency assignment position of the delay tolerant signal is the same as for the response signal, scheduling in the base station 100 becomes easy.

<DL Data Self-Contained Resource Assignment Method 2>

The terminal 200 transmits a delay tolerant signal within a frequency band having assigned thereto downlink data, which is transmitted within the same time unit.

Figure 20:
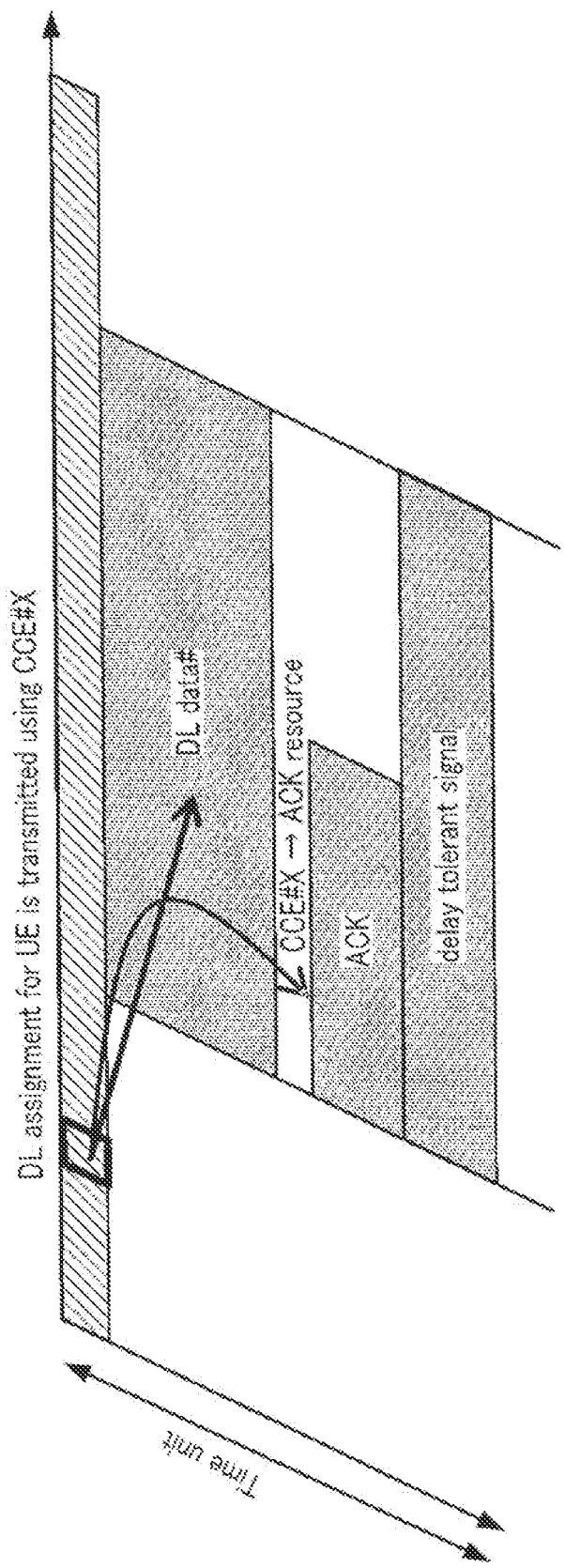
FIG. 20 is a drawing depicting an example of a resource assignment method for a delay tolerant signal according to embodiment 2.

FIG. 20 depicts an example of the assignment of a frequency resource for downlink data and a delay tolerant signal according to DL data self-contained resource assignment method 2. In FIG. 20, the terminal 200 specifies an assigned resource for the downlink data (DL data) by means of a DL assignment addressed thereto. The terminal 200 then specifies a resource within the same frequency band as the frequency band assigned to the downlink data, as the assigned resource for a delay tolerant signal.

It should be noted that, although FIG. 20 depicts an example in which the assigned resource for a delay tolerant signal is the same as for downlink data, the assigned resource for the delay tolerant signal may not be the same as long as it is within the band to which the downlink data is assigned.

Furthermore, in a case where downlink data is mapped to non-contiguous bands, the terminal 200 may select one or more bands in descending order of bandwidth from among the non-contiguous bands.

Furthermore, in a case where downlink data is transmitted by means of MU-MIMO, delay tolerant signals of a plurality of terminals 200 are assigned to the same band. In this case, a method is feasible in which delay tolerant signals are also transmitted by means of MU-MIMO in a manner similar to the downlink data. Furthermore, a method may be adopted in which the assigned band for downlink data is divided by the number of terminals multiplexed by means of MU-MIMO, and, for example, a port number for a reference signal (also referred to as a demodulation reference signal: DMRS) for demodulating downlink data and a divided frequency band are associated.

In this way, a delay tolerant signal is mapped to within the same frequency band as the frequency band having assigned thereto downlink data transmitted in the same time unit as the delay tolerant signal. By associating the frequency assignment position of the delay tolerant signal with the downlink data, the amount of downlink control information can be reduced.

Furthermore, as depicted in FIG. 19, in a case where the assigned bandwidth for a response signal (ACK) is narrow when the assigned resource for a delay tolerant signal is associated with the assigned resource for the response signal, the bandwidth for the delay tolerant signal also becomes small. In contrast, as depicted in FIG. 20, by associating the assigned resource for a delay tolerant signal with an assigned resource for downlink data, it is possible to prevent the assigned bandwidth for the delay tolerant signal becoming narrow.

Furthermore, downlink data is scheduled and therefore there is a high possibility of downlink data being assigned to a frequency band having a high SINR. Thus, in the case of a TDD system, a scheduling gain can be obtained by a delay tolerant signal being transmitted in the same band as downlink data.

<UL Data Self-Contained Resource Assignment Method>

Next, a resource assignment method during a UL data self-contained operation (UL data self-contained resource assignment method) will be described.

The terminal 400 transmits a delay tolerant signal within a frequency band having assigned thereto uplink data, which is transmitted within the same time unit.

Figure 21:
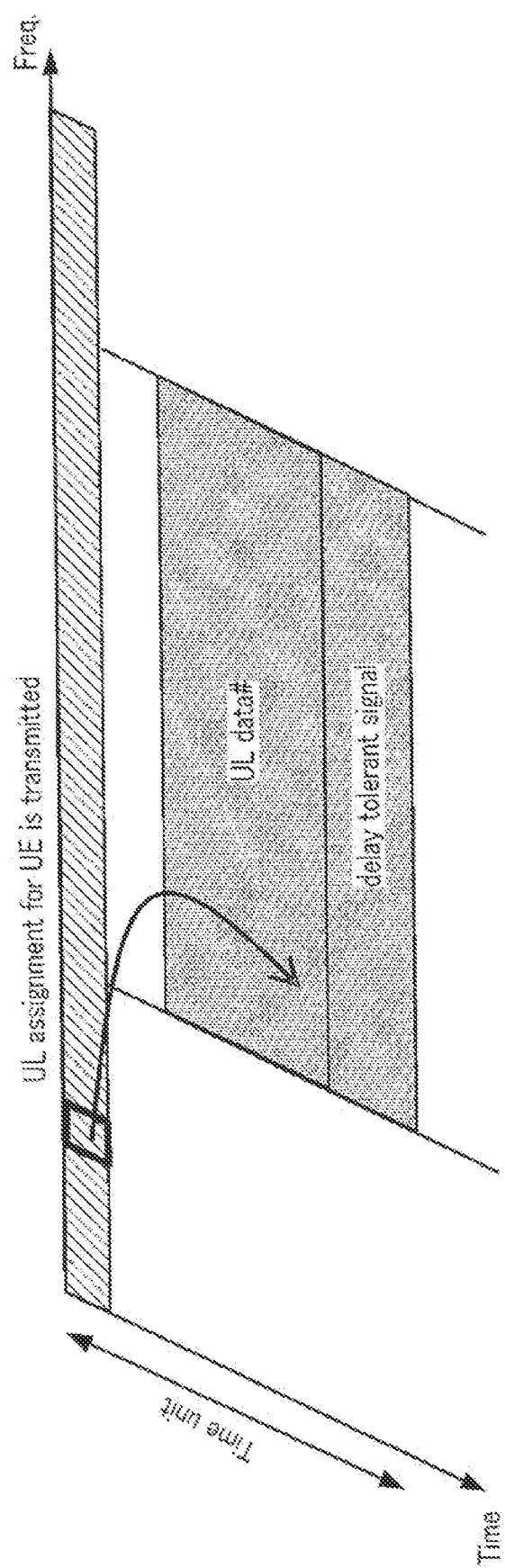
FIG. 21 is a drawing depicting an example of a resource assignment method for a delay tolerant signal according to embodiment 2.

FIG. 21 depicts an example of the assignment of a frequency resource for uplink data and a delay tolerant signal according to a UL data self-contained resource assignment method. In FIG. 21, the terminal 400 specifies an assigned resource for the uplink data (UL data) by means of a UL assignment addressed thereto. The terminal 400 then specifies a resource within the same frequency resource as the frequency resource to which the uplink data has been assigned, as the assigned resource for a delay tolerant signal.

It should be noted that, although FIG. 21 depicts an example in which the assigned resource for a delay tolerant signal is the same as for uplink data, the assigned resource for the delay tolerant signal may not be the same as long as it is within the band to which the uplink data is assigned.

Furthermore, in a case where uplink data is transmitted by means of MU-MIMO, delay tolerant signals of a plurality of terminals 400 are assigned to the same band. In this case, a method is feasible in which delay tolerant signals are also transmitted by means of MU-MIMO in a manner similar to uplink data. Furthermore, a method may be adopted in which the assigned band for uplink data is divided by the number of terminals multiplexed by means of MU-MIMO, and, for example, a port number for a reference signal (DMRS) for demodulating uplink data and a divided frequency band are associated.

In this way, a delay tolerant signal is mapped to within the same frequency band as the frequency band having assigned thereto uplink data transmitted in the same time unit as the delay tolerant signal. By associating the frequency assignment position of the delay tolerant signal with the uplink data, the amount of downlink control information can be reduced. Furthermore, since the frequency assignment position of the uplink data is the same as for the delay tolerant signal, scheduling in the base station 300 becomes easy. Furthermore, since the uplink data is scheduled, there is a high possibility of a signal being assigned to a frequency band having a high SINR. Thus, a scheduling gain can be obtained by the delay tolerant signal being transmitted in the same band as the uplink data.

Hereinabove, the details of resource assignment methods for a delay tolerant signal have been described.

In this way, in the present embodiment, it is not necessary to notify a frequency resource (assigned resource information) used to transmit a delay tolerant signal, from the base stations 100 and 300 to the terminals 200 and 400 using a downlink control signal, and therefore it is possible to prevent an increase in the overhead for control signals.

Embodiment 3

In embodiments 1 and 2, methods have been described in which performance is improved by, in a case where a self-contained operation is used, mapping a delay tolerant signal to the end of an uplink transmission region, that is, a gap period (gap #2) that takes into consideration the processing time of a base station.

However, in a case where the processing time for receiving/decoding downlink data in a terminal is long, it is necessary to increase a gap period (gap #1) that is a switching point between a downlink transmission region and an uplink transmission region, and therefore the overhead for gap #1 becomes large.

Thus, in the present embodiment, a method will be described in which the overhead for gap #1 is reduced by mapping a delay tolerant signal to within a gap period (gap #1) that is subsequent to a downlink transmission region, that is, a period that is provided with consideration being given to the processing time of a terminal.

[Overview of Communication System]

A communication system that carries out a DL data self-contained operation according to the present embodiment is provided with a base station 500 and a terminal 600. Furthermore, a communication system that carries out a UL data self-contained operation according to each embodiment of the present disclosure is provided with a base station 700 and a terminal 800.

[Configuration of Base Station (During DL Data Self-Contained Operation)]

Figure 22:
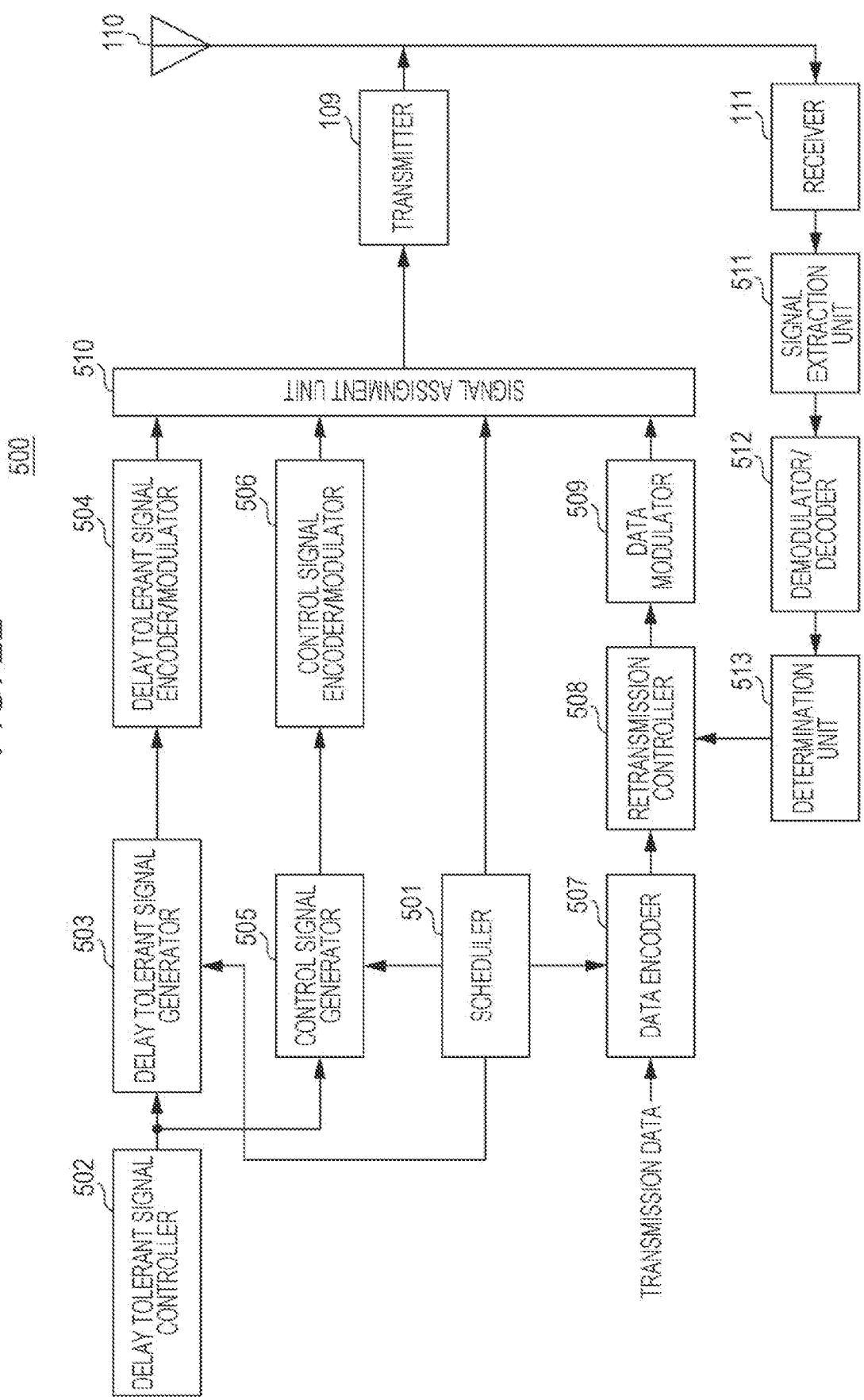
FIG. 22 is a block diagram depicting the configuration of a base station during a DL data self-contained operation according to embodiment 3.

FIG. 22 is a block diagram depicting a configuration of the base station 500 that carries out a DL data self-contained operation according to the present embodiment. In FIG. 22, the base station 500 has a scheduler 501, a delay tolerant signal controller 502, a delay tolerant signal generator 503, a delay tolerant signal encoder/modulator 504, a control signal generator 505, a control signal encoder/modulator 506, a data encoder 507, a retransmission controller 508, a data modulator 509, a signal assignment unit 510, the transmitter 109, the antenna 110, the receiver 111, a signal extraction unit 511, a demodulator/decoder 512, and a determination unit 513.

The base station 500 depicted in FIG. 22 transmits a downlink signal that includes a control signal (a DL assignment), downlink data (DL data), or a delay tolerant signal in a downlink transmission region, in a time unit (DL data self-contained time unit) that includes the "downlink transmission region", an "uplink transmission region", and a "gap period". Furthermore, the base station 500 receives an uplink signal that includes a response signal (and may also include a UCI) that is transmitted from the terminal 600 in the uplink transmission region, in the time unit.

In the base station 500, the scheduler 501 determines scheduling information (for example, the ID of an assigned terminal, assigned resource information for the terminal 600 (a frequency, a time, and a coding resource), data demodulation reference signal information, a modulation/encoding scheme, assigned resource information for a response signal (a frequency, a time, and a coding resource), or the like) relating to a delay tolerant signal, a control signal (a DL assignment), and downlink data (DL data) in the time unit, with respect to the terminal 600. The scheduler 501 outputs the determined scheduling information to the delay tolerant signal generator 503, the control signal generator 505, the data encoder 507, and the signal assignment unit 510.

The delay tolerant signal controller 502 determines information regarding a signal (for example, the signal type) that is generated as a delay tolerant signal, which is a signal or a channel that is transmitted from the base station 500 at the end of the downlink transmission region within the time unit, and outputs information indicating the determined content to the delay tolerant signal generator 503 and the control signal generator 505. It should be noted that the details of a delay tolerant signal determined in the delay tolerant signal controller 502 will be described hereinafter.

The delay tolerant signal generator 503 generates a delay tolerant signal on the basis of information that is input from the delay tolerant signal controller 502 and scheduling information that is instructed from the scheduler 501, and outputs the generated delay tolerant signal to the delay tolerant signal encoder/modulator 504.

The delay tolerant signal encoder/modulator 504 encodes and modulates the delay tolerant signal (a bit sequence) that is input from the delay tolerant signal generator 503, and outputs a modulated delay tolerant signal (symbol string) to the signal assignment unit 510.

The control signal generator 505 generates a control signal (a DL assignment) for the terminal 600 on the basis of information that is input from each of the scheduler 501 and the delay tolerant signal controller 502. Control signals include a signal of a cell-specific higher layer, a signal of a group or RAT-specific higher layer, a signal of a terminal-specific higher layer, assigned resource information for downlink data, assigned resource information for a delay tolerant signal, information instructing the type of delay tolerant signal (hereinafter, referred to as delay tolerant signal type information), assigned resource information for a response signal, and the like. The control signal generator 505 generates a control information bit string using such control information, and outputs the generated control information bit string to the control signal encoder/modulator 506.

It should be noted that assigned resource information for a delay tolerant signal or the delay tolerant signal type information may be notified in advance by means of a higher layer notification from the base station 500 to the terminal 600. In this case, the assigned resource information for a delay tolerant signal or the delay tolerant signal type information is not included in a control signal (a DL assignment).

FIG. 23 depicts an example of the delay tolerant signal type information. In FIG. 23, delay tolerant signal type information (an index) and the types of delay tolerant signals transmitted from the base station 500 are associated.

The control signal encoder/modulator 506 encodes and modulates the control signal (a bit string) received from the control signal generator 505, and outputs a modulated control signal to the signal assignment unit 510.

The data encoder 507 carries out error correction encoding on transmission data (downlink data) in accordance with an encoding scheme received from the scheduler 501, and outputs an encoded data signal to the retransmission controller 508.

The retransmission controller 508, at the time of the first transmission, retains the encoded data signal received from the data encoder 507 and also outputs the encoded data signal to the data modulator 509. Furthermore, the retransmission controller 508, at the time of a retransmission, controls the retained data on the basis of a determination result (an ACK/NACK) from the determination unit 513. Specifically, the retransmission controller 508, upon receiving a NACK with respect to the data signal, outputs the corresponding retained data to the data modulator 509. Furthermore, the retransmission controller 508, upon receiving an ACK with respect to the data signal, discards the corresponding retained data and ends the transmission of downlink data.

The data modulator 509 modulates a data signal received from the retransmission controller 508, and outputs the modulated data signal (symbol string) to the signal assignment unit 510.

The signal assignment unit 510 maps a delay tolerant signal received from the delay tolerant signal encoder/modulator 504, a control signal received from the control signal encoder/modulator 506, and a data signal received from the data modulator 509 to a radio resource instructed from the scheduler 501. The signal assignment unit 510 outputs a downlink signal for which signal mapping has been carried out, to the transmitter 109.

The transmitter 109, the antenna 110, and the receiver 111 operate in a manner similar to the transmitter 109, the antenna 110, and the receiver 111 provided in the base station 100.

The signal extraction unit 511 extracts a radio resource portion in which an uplink response signal from the terminal 600 has been transmitted, from the reception signal, and outputs a reception response signal to the demodulator/decoder 512.

The demodulator/decoder 512 carries out equalization, demodulation, and decoding on the reception response signal that is received from the signal extraction unit 511, and outputs a decoded bit sequence to the determination unit 513.

The determination unit 513 determines whether a response signal for downlink data, transmitted from the terminal 600, indicates an ACK or NACK with respect to the downlink data, on the basis of the bit sequence that is input from the demodulator/decoder 512. The determination unit 513 outputs a determination result (an ACK or NACK) to the retransmission controller 508.

[Configuration of Terminal (During DL Data Self-Contained Operation)]

Figure 24:
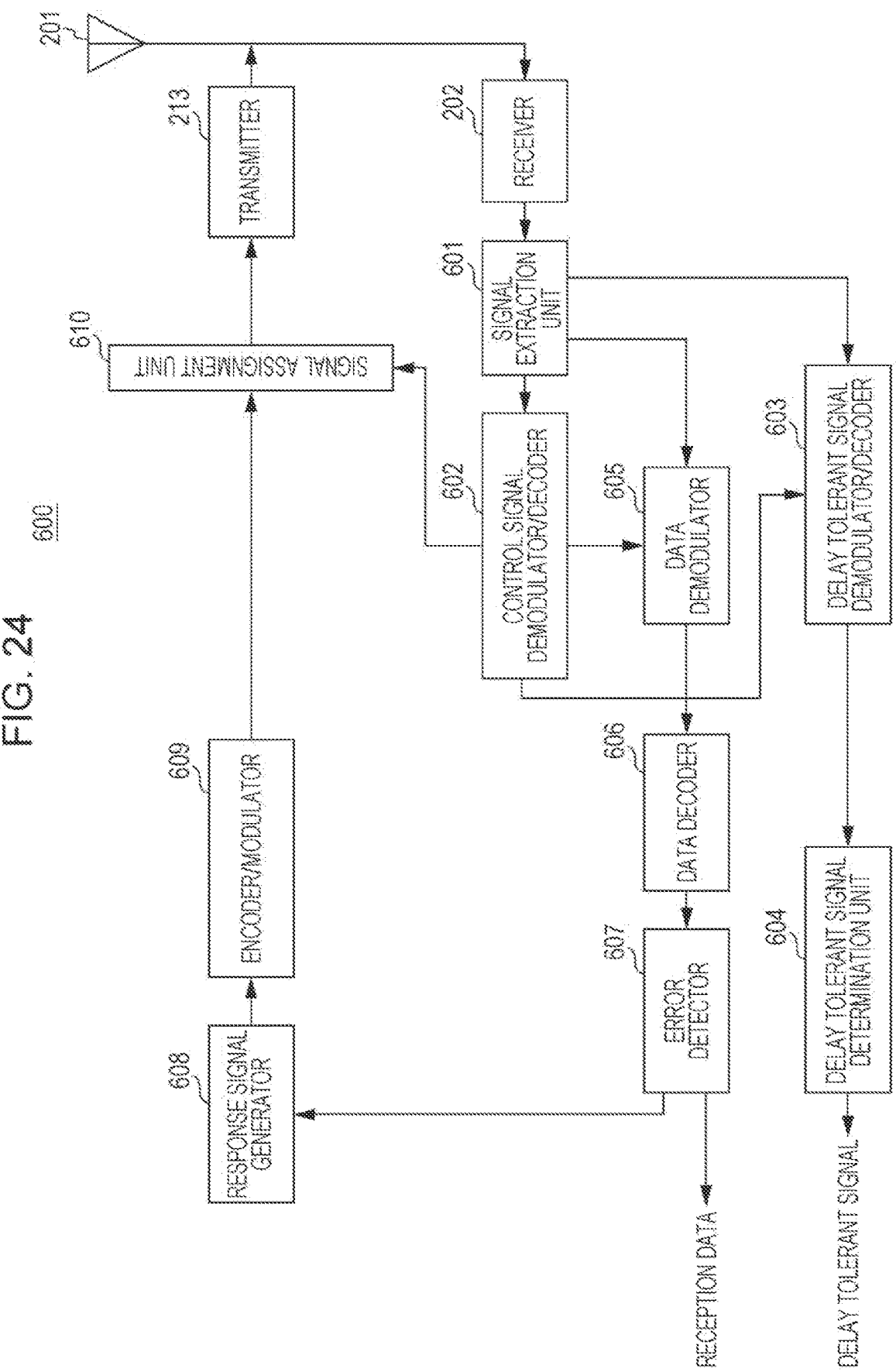
FIG. 24 is a block diagram depicting a configuration of a terminal during a DL data self-contained operation according to embodiment 3.

FIG. 24 is a block diagram depicting a configuration of the terminal 600 that carries out a DL data self-contained operation according to the present embodiment. In FIG. 24, the terminal 600 has the antenna 201, the receiver 202, a signal extraction unit 601, a control signal demodulator/decoder 602, a delay tolerant signal demodulator/decoder 603, a delay tolerant signal determination unit 604, a data demodulator 605, a data decoder 606, an error detector 607, a response signal generator 608, an encoder/modulator 609, a signal assignment unit 610, and the transmitter 213.

The terminal 600 depicted in FIG. 24 receives a downlink signal that includes a delay tolerant signal, a control signal (a DL assignment), or downlink data (DL data) transmitted from the base station 500 in a downlink transmission region, in a time unit (DL data self-contained time unit) that includes the "downlink transmission region", a "gap period", and an "uplink transmission region". Furthermore, the terminal 600 transmits an uplink signal that includes a response signal for downlink data (and may also include a UCI) in the uplink transmission region in the time unit.

In the terminal 600, the antenna 201 and the receiver 202 operate in a manner similar to the antenna 201 and the receiver 202 provided in the terminal 200.

The signal extraction unit 601 extracts a signal portion that includes a control signal from a baseband signal received from the receiver 202, and outputs the signal portion to the control signal demodulator/decoder 602. Furthermore, the signal extraction unit 601 extracts a signal portion that includes downlink data from the baseband signal, and outputs the signal portion to the data demodulator 605. Furthermore, the signal extraction unit 601 extracts a signal portion that includes a delay tolerant signal from the baseband signal, and outputs the signal portion to the delay tolerant signal demodulator/decoder 603.

The control signal demodulator/decoder 602 carries out blind decoding on a control signal received from the signal extraction unit 601, and attempts decoding for a control signal addressed thereto. The control signal demodulator/decoder 602, when having determined as a result of the blind decoding that the control signal is a control signal addressed thereto, outputs, to the data demodulator 605, assigned resource information for downlink data included in the control signal (the ID of an assigned terminal, assigned resource information (a frequency, a time, and a coding resource), data demodulation reference signal information, a modulation/encoding scheme, or the like), outputs assigned resource information (a frequency, a time, and a coding resource) for a response signal to the signal assignment unit 610, and outputs assigned resource information for a delay tolerant signal and delay tolerant signal type information to the delay tolerant signal demodulator/decoder 603.

The delay tolerant signal demodulator/decoder 603 carries out equalization, demodulation, and error correction decoding for a delay tolerant signal that is input from the signal extraction unit 601, on the basis of the assigned resource information for the delay tolerant signal and the delay tolerant signal type that are input from the control signal demodulator/decoder 602, and outputs a decoded bit sequence to the delay tolerant signal determination unit 604.

The delay tolerant signal determination unit 604 determines whether or not the delay tolerant signal (a bit sequence) that is input from the delay tolerant signal demodulator/decoder 603 has been correctly received. The delay tolerant signal determination unit 604, when having determined that the delay tolerant signal has been correctly received, outputs the delay tolerant signal.

The data demodulator 605 demodulates downlink data received from the signal extraction unit 601, on the basis of assigned resource information for downlink data, received from the control signal demodulator/decoder 602, and outputs demodulated downlink data to the data decoder 606.

The data decoder 606 decodes the downlink data received from the data demodulator 605, and outputs decoded downlink data to the error detector 607.

The error detector 607 carries out error detection by means of a CRC, for example, with respect to the downlink data received from the data decoder 606, and outputs an error detection result (an ACK or NACK) to the response signal generator 608. Furthermore, the error detector 607 outputs, as reception data, downlink data determined as having no errors as a result of the error detection.

The response signal generator 608, using the error detection result (an ACK or NACK) received from the error detector 607, generates a response signal (a bit sequence) for the received downlink data, and outputs the response signal to the encoder/modulator 609.

The encoder/modulator 609 carries out error correction encoding on the response signal (a bit sequence) received from the response signal generator 608, modulates an encoded bit sequence, and outputs a modulated symbol sequence to the signal assignment unit 610.

The signal assignment unit 610 maps a signal received from the encoder/modulator 609 to a resource (a time, a frequency, and a coding resource) within a time unit for a self-contained operation, instructed from the control signal demodulator/decoder 602.

The transmitter 213 operates in a manner similar to the transmitter 213 provided in the terminal 200.

[Configuration of Base Station (During UL Data Self-Contained Operation)]

Figure 25:
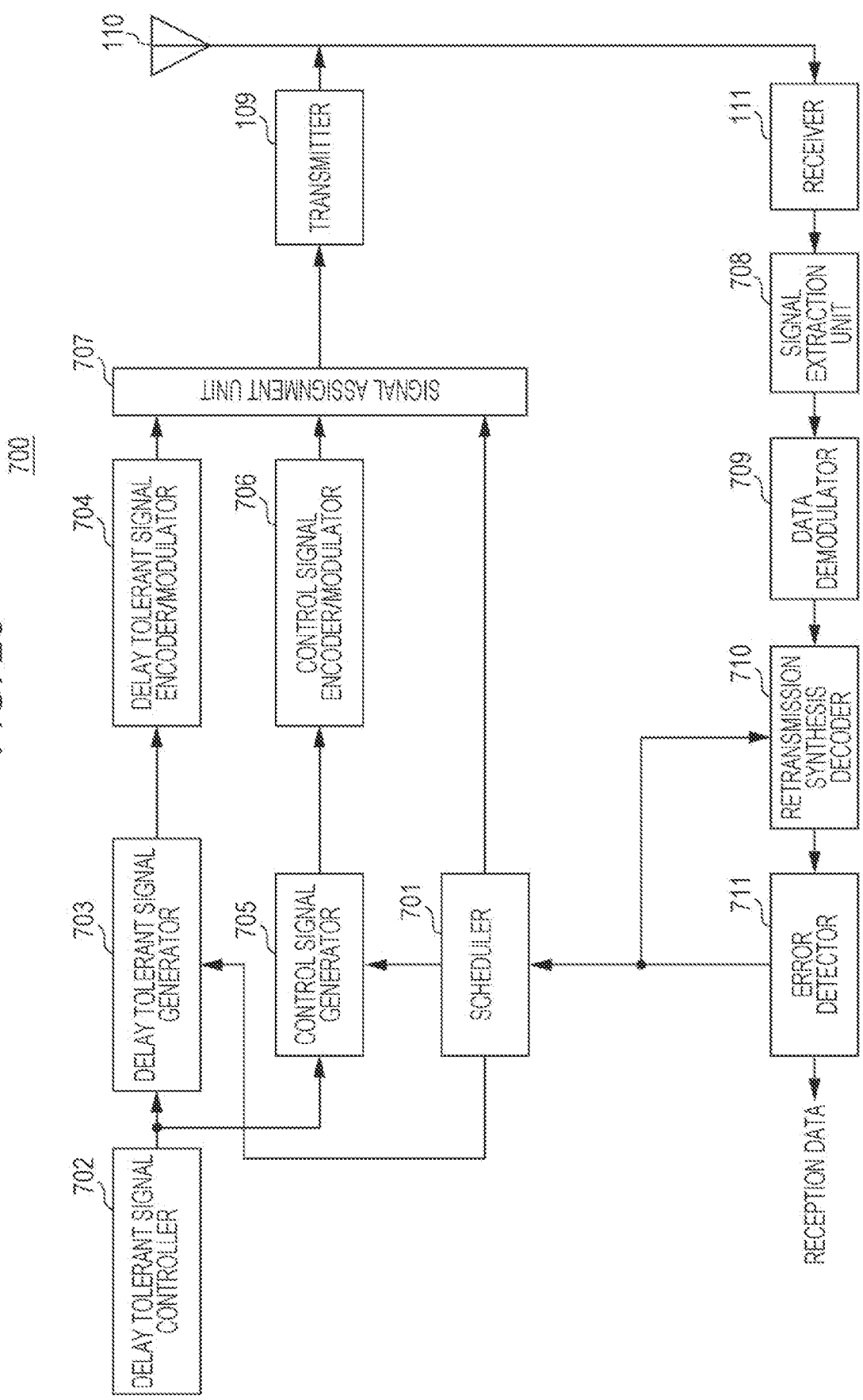
FIG. 25 is a block diagram depicting a configuration of a base station during a UL data self-contained operation according to embodiment 3.

FIG. 25 is a block diagram depicting a configuration of the base station 700 that carries out a UL data self-contained operation according to the present embodiment. In FIG. 25, the base station 700 has a scheduler 701, a delay tolerant signal controller 702, a delay tolerant signal generator 703, a delay tolerant signal encoder/modulator 704, a control signal generator 705, a control signal encoder/modulator 706, a signal assignment unit 707, the transmitter 109, the antenna 110, the receiver 111, a signal extraction unit 708, a data demodulator 709, a retransmission synthesis decoder 710, and an error detector 711.

The base station 700 depicted in FIG. 25 transmits a downlink signal that includes a delay tolerant signal and a UL assignment in a downlink transmission region of a time unit (UL data self-contained time unit) that includes the "downlink transmission region", a "gap period", and an "uplink transmission region". Furthermore, the base station 700 receives an uplink signal that includes uplink data (and may also include a UCI) that is transmitted from the terminal 800 in the uplink transmission region of the time unit.

In the base station 700, the scheduler 701 schedules the retransmission of uplink data in a case where an error detection result indicating that there is an error in the previous uplink data is input from the error detector 711.

Furthermore, the scheduler 701 schedules a new packet for the terminal 800 in a case where an error detection result indicating that there are no errors in the previous uplink data is input from the error detector 711.

For example, the scheduler 701 determines scheduling information (for example, the ID of an assigned terminal, assigned resource information for the terminal 800 (a frequency, a time, and a coding resource), data demodulation reference signal information, a modulation/encoding scheme for uplink data, or the like) relating to a delay tolerant signal, a control signal (a UL assignment), and uplink data (UL data) in a time unit, with respect to the terminal 800. The scheduler 701 outputs the determined scheduling information to the delay tolerant signal generator 703, the control signal generator 705, and the signal assignment unit 707.

The delay tolerant signal controller 702 determines information (for example, the type of delay tolerant signal) relating to a signal that is generated as a delay tolerant signal, which is a signal or a channel that is transmitted from the base station 700 at the end of the downlink transmission region within the time unit, and outputs information indicating the determined content to the delay tolerant signal generator 703 and the control signal generator 705. It should be noted that the details of the signal types determined in the delay tolerant signal controller 702 will be described hereinafter.

The delay tolerant signal generator 703 generates a delay tolerant signal on the basis of information that is input from the delay tolerant signal controller 702 and scheduling information that is instructed from the scheduler 701, and outputs the generated delay tolerant signal to the delay tolerant signal encoder/modulator 704.

The delay tolerant signal encoder/modulator 704 encodes and modulates the delay tolerant signal (a bit sequence) that is input from the delay tolerant signal generator 703, and outputs a modulated delay tolerant signal (symbol string) to the signal assignment unit 707.

The control signal generator 705 generates a control signal (a UL assignment) for the terminal 800 on the basis of information that is input from each of the scheduler 701 and the delay tolerant signal controller 702. Control signals include a signal of a cell-specific higher layer, a signal of a group or RAT-specific higher layer, a signal of a terminal-specific higher layer, assigned resource information for uplink data, information instructing a retransmission or a new transmission of uplink data, assigned resource information for a delay tolerant signal, information indicating the type of delay tolerant signal (delay tolerant signal type information), or the like. The control signal generator 705 generates a control information bit string using such control information, encodes the generated control information bit string, and outputs the encoded control signal to the control signal encoder/modulator 706.

It should be noted that assigned resource information for a delay tolerant signal or the delay tolerant signal type information may be notified in advance by means of a higher layer notification from the base station 700 to the terminal 800. In this case, the assigned resource information for a delay tolerant signal or the delay tolerant signal type information is not included in a control signal (a DL assignment).

The control signal encoder/modulator 706 encodes and modulates a control signal received from the control signal generator 705, and outputs a modulated control signal to the signal assignment unit 707.

The signal assignment unit 707 maps a delay tolerant signal received from the delay tolerant signal encoder/ modulator 704 and a control signal received from the control signal encoder/modulator 706 to a radio resource (an assigned time/frequency/coding resource) instructed from the scheduler 701. The signal assignment unit 707 outputs a downlink signal for which signal mapping has been carried out, to the transmitter 109.

The transmitter 109, the antenna 110, and the receiver 111 operate in a manner similar to the transmitter 109, the antenna 110, and the receiver 111 provided in the base station 100.

The signal extraction unit 708 extracts a radio resource portion in which uplink data from the terminal 800 has been transmitted, from a reception signal that is input from the receiver 111, and outputs the radio resource portion to the data demodulator 709.

The data demodulator 709 carries out equalization and demodulation processing on uplink data received from the signal extraction unit 708, and outputs demodulated uplink data (a bit sequence) to the retransmission synthesis decoder 710.

The retransmission synthesis decoder 710, in a case where uplink data to be decoded of the terminal 800 is retained (a case where the uplink data is retransmission data), synthesizes the uplink data retained and uplink data that has been output from the data demodulator 709, and carries out decoding processing on the synthesized uplink data. The retransmission synthesis decoder 710, in a case where uplink data of the terminal 800 is not retained (a case where the uplink data is the first packet), carries out decoding processing without carrying out synthesis processing for uplink data. The retransmission synthesis decoder 710 then outputs decoded uplink data to the error detector 711. Furthermore, the retransmission synthesis decoder 710, in a case where a detection result from the error detector 711 indicates that there are no errors, deletes the retained uplink data of the terminal 800.

The error detector 711 carries out error detection by means of a CRC, for example, with respect to uplink data received from the retransmission synthesis decoder 710, and outputs an error detection result (an ACK or NACK) to the scheduler 701 and the retransmission synthesis decoder 710. Furthermore, the error detector 711 outputs, as reception data, uplink data determined as having no errors as a result of the error detection.

[Configuration of Terminal (During UL Data Self-Contained Operation)]

Figure 26:
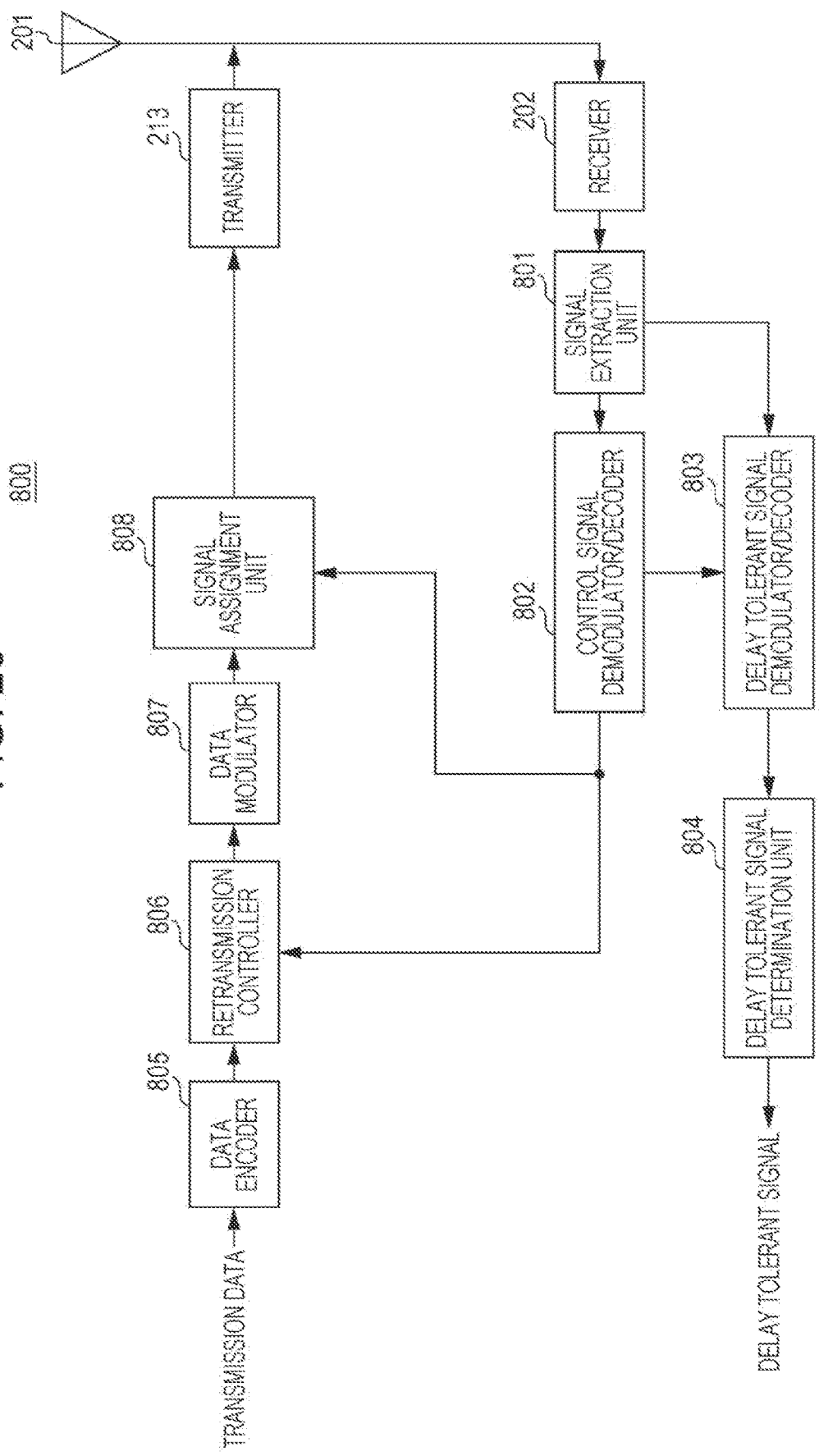
FIG. 26 is a block diagram depicting a configuration of a terminal during a UL data self-contained operation according to embodiment 3.

FIG. 26 is a block diagram depicting a configuration of the terminal 800 that carries out a UL data self-contained operation according to the present embodiment. In FIG. 26, the terminal 800 has the antenna 201, the receiver 202, a signal extraction unit 801, a control signal demodulator/decoder 802, a delay tolerant signal demodulator/decoder 803, a delay tolerant signal determination unit 804, a data encoder 805, a retransmission controller 806, a data modulator 807, a signal assignment unit 808, and the transmitter 213.

The terminal 800 depicted in FIG. 26 receives a downlink signal that includes a delay tolerant signal or a control signal (a UL assignment) transmitted from the base station 700 in a downlink transmission region of a time unit (UL data self-contained time unit) that includes the "downlink transmission region", a "gap period", and an "uplink transmission region". Furthermore, the terminal 800 transmits an uplink signal that includes uplink data (and may also include a UCI) in the uplink transmission region of the time unit.

In the terminal 800, the antenna 201 and the receiver 202 operate in a manner similar to the antenna 201 and the receiver 202 provided in the terminal 200.

The signal extraction unit 801 extracts a control signal from a baseband signal received from the receiver 202, and outputs the control signal to the control signal demodulator/decoder 802. Furthermore, the signal extraction unit 801 extracts a signal portion that includes a delay tolerant signal from the baseband signal, and outputs the delay tolerant signal to the delay tolerant signal demodulator/decoder 803.

The control signal demodulator/decoder 802 carries out blind decoding on a control signal received from the signal extraction unit 801, and attempts decoding for a control signal addressed thereto. The control signal demodulator/decoder 802, when having determined as a result of the blind decoding that the control signal is a control signal addressed thereto, outputs, to the signal assignment unit 808, assigned resource information for uplink data (the ID of an assigned terminal, assigned resource information (a frequency, a time, and a coding resource), data demodulation reference signal information, a modulation/encoding scheme, or the like), included in the control signal, outputs information instructing a retransmission or a new transmission of uplink data to the retransmission controller 806, and outputs assigned resource information for a delay tolerant signal and delay tolerant signal type information to the delay tolerant signal demodulator/decoder 803.

The delay tolerant signal demodulator/decoder 803 carries out equalization, demodulation, and error correction decoding for a delay tolerant signal that is input from the signal extraction unit 801, on the basis of the assigned resource information for the delay tolerant signal and the delay tolerant signal type information that are input from the control signal demodulator/decoder 802, and outputs a decoded bit sequence to the delay tolerant signal determination unit 804.

The delay tolerant signal determination unit 804 determines whether or not the delay tolerant signal (a bit sequence) that is input from the delay tolerant signal demodulator/decoder 803 has been correctly received. The delay tolerant signal determination unit 804, when having determined that the delay tolerant signal has been correctly received, outputs the delay tolerant signal.

The data encoder 805 carries out error correction encoding on transmission data (uplink data), and outputs an encoded data signal to the retransmission controller 806.

The retransmission controller 806 determines whether or not the uplink data is the first packet or a retransmission packet on the basis of information received from the control signal demodulator/decoder 802. In the case of the first packet, the retransmission controller 806 retains the encoded uplink data received from the data encoder 805 and also outputs the encoded uplink data to the data modulator 807. Furthermore, in the case of the first packet, the retransmission controller 806 determines that the transmission and reception of the previous transmission packet has been successful and discards the retained data. However, in the case of a retransmission packet, the retransmission controller 806 outputs the corresponding retained data to the data modulator 807.

The data modulator 807 modulates the uplink data received from the retransmission controller 806, and outputs the modulated uplink data to the signal assignment unit 808.

The signal assignment unit 808 maps the uplink data received from the data modulator 807 to a resource (a time, a frequency, and a coding resource) within a time unit for a self-contained operation, instructed from the control signal demodulator/decoder 802. The signal assignment unit 808 outputs an uplink signal for which signal mapping has been carried out, to the transmitter 213.

The transmitter 213 operates in a manner similar to the transmitter 213 provided in the terminal 200.

[Operation of Base Stations 500 and 700 and Terminals 600 and 800]

A detailed description will be given regarding an operation in the base stations 500 and 700 and the terminals 600 and 800 having the above configurations.

Figure 27:
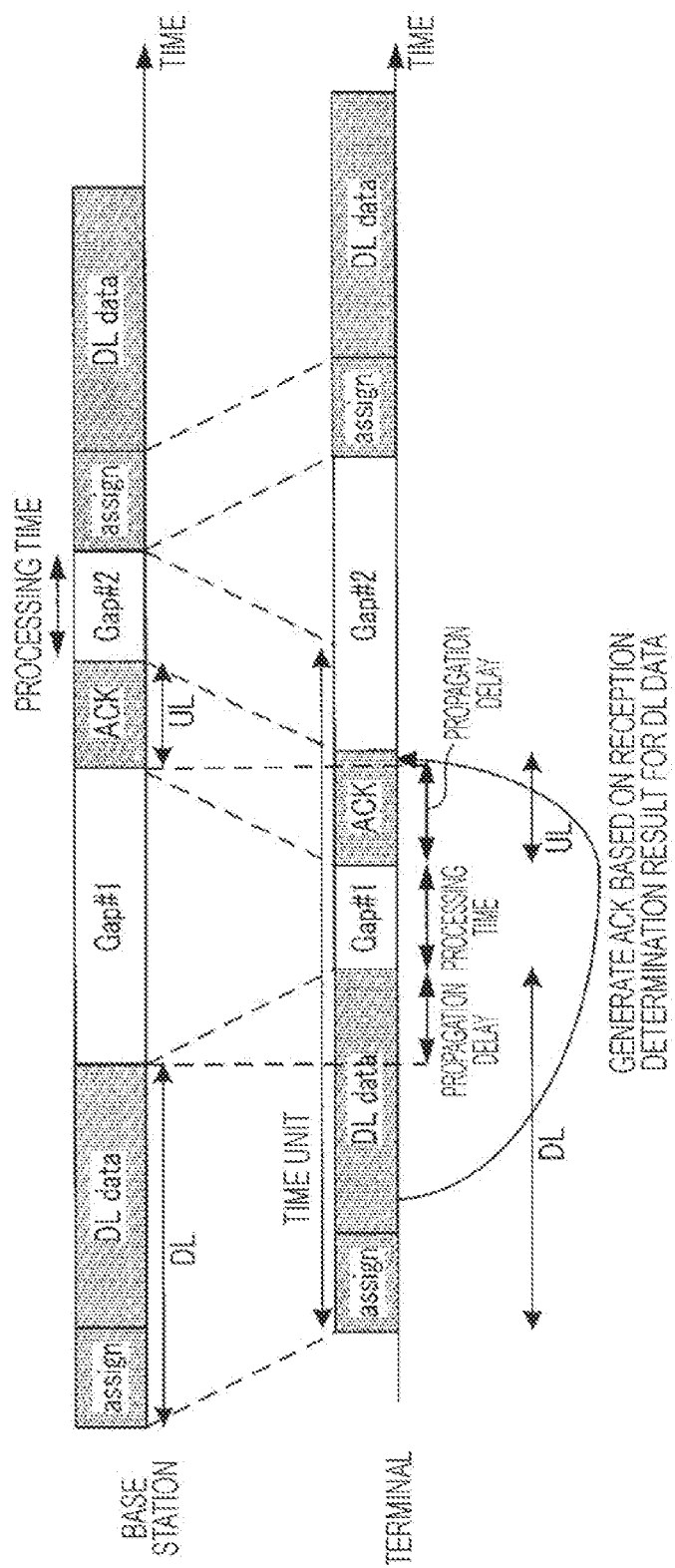
FIG. 27 is a drawing depicting an example of a transmission sequence in a base station and a terminal during a DL data self-contained operation.

FIG. 27 depicts an example of a transmission sequence in each of a base station (eNB) and a terminal (UE) during the DL data self-contained operation of FIG. 1A. Furthermore, FIG. 28 depicts an example of a transmission sequence in each of the base station 500 and the terminal 600 during the DL data self-contained operation according to the present embodiment.

In FIG. 27, in each time unit, gap #1 that takes into consideration the propagation delay time and the processing time of the terminal is arranged between a downlink transmission region and an uplink transmission region (at the end of the downlink transmission region), and gap #2 that takes into consideration the processing time of the base station is arranged after the uplink transmission region (at the end of the uplink transmission region). For example, the terminal carries out reception processing for downlink data received in the downlink transmission region, in the period of gap #1 depicted in FIG. 27, and transmits a response signal (ACK) for the downlink data in the uplink transmission region.

Figure 28:
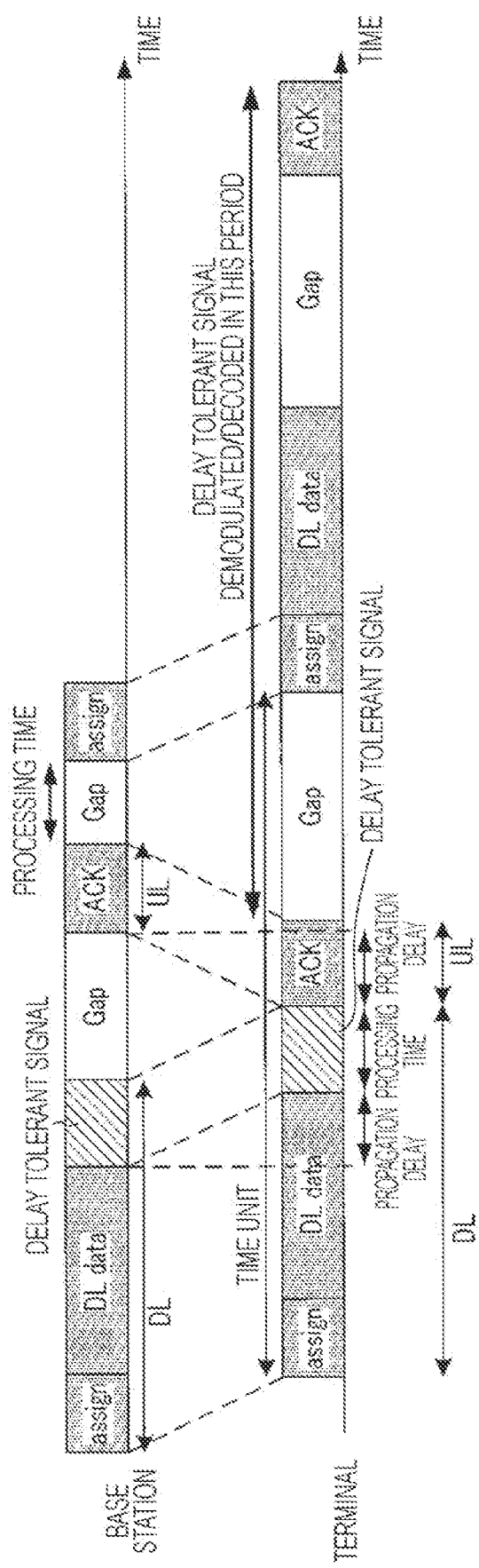
FIG. 28 is a drawing depicting an example of a transmission sequence in a base station and a terminal during a DL data self-contained operation according to embodiment 3.

However, in the present embodiment, as depicted in FIG. 28, in a DL data self-contained operation, a delay tolerant signal, for which a delay can be tolerated more than for a control signal or downlink data (DL data) that is mapped to the downlink transmission region, is mapped to a period that takes into consideration the processing time of terminal 600 within gap #1 arranged between the downlink transmission region and the uplink transmission region depicted in FIG. 27.

That is, the base station 500 transmits a delay tolerant signal that has been mapped to a period corresponding to gap #1 between the downlink transmission region and the uplink transmission region, and the terminal 600 receives the delay tolerant signal that has been mapped to the period corresponding to gap #1.

It should be noted that, as depicted in FIG. 28, in the base station 500, out of the period corresponding to gap #1, the length of the period in which the delay tolerant signal is arranged corresponds to the processing time of the terminal 600, and the remaining period remains as a gap period that takes into consideration a propagation delay between the base station 500 and the terminal 600.

In this case also, the terminal 600, upon receiving downlink data in the downlink transmission region, is able to carry out reception processing for downlink data in the transmission period for the delay tolerant signal (corresponding to gap #1), and transmit a response signal for the downlink data in the uplink transmission region.

Furthermore, the terminal 600, upon receiving a delay tolerant signal transmitted from the base station 500 at the end of the downlink transmission region, carries out predetermined processing (demodulation/decoding processing or the like) on the delay tolerant signal. As mentioned above, a delay tolerant signal is a signal for which it is not always necessary to carry out reception/decoding processing or the like by the time unit that is subsequent to the time unit in which the delay tolerant signal has been received by the terminal 600. That is, since a delay is tolerated for a delay tolerant signal, the terminal 600, for example, can carry out demodulation/decoding processing for a delay tolerant signal in a period corresponding to the next time unit.

It should be noted that, although FIG. 28 relates to during a DL data self-contained operation, in a UL data self-contained operation it is also sufficient to similarly configure a time unit in which a delay tolerant signal is mapped to a period corresponding to the processing time of the terminal 600 within gap #1 depicted in FIG. 1B.

It is thereby possible to reduce the overhead for gaps while maintaining the average delay time from a transmission buffer for the base station 500 being generated to the base station 500 receiving a response signal to downlink data from the terminal 600, and the average delay time from a transmission buffer for the terminal 800 being generated to the terminal 800 completing transmission of the first uplink data.

It should be noted that it is not always necessary for the base stations 500 and 700 to transmit a delay tolerant signal in each time unit. In a case where the base stations 500 and 700 do not transmit a delay tolerant signal, the time resource for a delay tolerant signal (the end of a downlink transmission region) becomes a gap period as in FIG. 1A and FIG. 1B. It is thereby possible to reduce power consumption by not carrying out excessive transmissions.

[Types of Delay Tolerant Times]

Next, the types of delay tolerant times that are generated in the delay tolerant signal generators 503 and 703 of the base stations 500 and 700 will be described in detail.

Hereinafter, the types of delay tolerant signals (common delay tolerant signal types) with which a performance improvement can be expected due to being transmitted in both a DL data self-contained operation and a UL data self-contained operation will be described.

<Common Delay Tolerant Signal Type 1>

A delay tolerant signal in common delay tolerant signal type 1 is system information (a MIB: master information block) of the base stations 500 and 700 constituting broadcast information.

A system bandwidth, the number of transmission antennas, and the like are included in a MIB.

A MIB has no effect on the retransmission control of downlink data or uplink data even if the terminals 600 and 800 do not complete reception/decoding processing by the next time unit. That is, a MIB is a signal for which a delay can be tolerated compared to a control signal (a DL assignment or a UL assignment) or downlink data transmitted in a downlink transmission region.

In this way, due to the base stations 500 and 700 transmitting a MIB in a gap period (part of gap #1) at the end of a downlink transmission region, in addition to the aforementioned effects, it is possible to increase the opportunities for the terminals 600 and 800 to receive system information of the base stations 500 and 700. Therefore, it is possible to shorten the time required for the terminals 600 and 800 to connect to the base stations 500 and 700.

<Common Delay Tolerant Signal Type 2>

A delay tolerant signal in common delay tolerant signal type 2 is system information (a SIB: system information block) of the base stations 500 and 700 constituting broadcast information.

A SIB includes parameters relating to access to the base stations 500 and 700, settings for common/shared channels (configuration), and the like. It should be noted that, in an LTE system, there are SIB 1 to SIB 11 as SIBs, and the content and period for transmission by each SIB are determined. One or more from among SIB 1 to SIB 11 may be SIBs that are transmitted as delay tolerant signals.

A SIB has no effect on the retransmission control of downlink data or uplink data even if the terminals 600 and 800 do not complete reception/decoding processing by the next time unit. That is, a SIB is a signal for which a delay can be tolerated compared to a control signal (a DL assignment or a UL assignment) or downlink data transmitted in a downlink transmission region.

In this way, due to the base stations 500 and 700 transmitting a SIB in a gap period (part of gap #1) at the end of a downlink transmission region, in addition to the aforementioned effects, it is possible to increase the opportunities for the terminals 600 and 800 to receive system information of the base stations 500 and 700. Therefore, it is possible to shorten the time required for the terminals 600 and 800 to connect to the base stations 500 and 700.

<Common Delay Tolerant Signal Type 3>

A delay tolerant signal in common delay tolerant signal type 3 is MBMS data, which is broadcast distribution data that is multicast/broadcast.

MBMS data has no effect on the retransmission control of downlink data or uplink data even if the terminals 600 and 800 do not complete reception/decoding processing by the next time unit. That is, MBMS data is a signal for which a delay can be tolerated compared to a control signal (a DL assignment or a UL assignment) or downlink data transmitted in a downlink transmission region.

In this way, due to the base stations 500 and 700 transmitting MBMS data in a gap period (part of gap #1) at the end of a downlink transmission region, in addition to the aforementioned effects, it is possible to increase the opportunities for the terminals 600 and 800 to receive broadcast distribution data that is multicast/broadcast.

<Common Delay Tolerant Signal Type 4>

A delay tolerant signal in common delay tolerant signal type 4 is information instructing a time unit or symbol configuration that can be transmitted in a downlink and an uplink within a certain time period (sometimes also referred to as a DL/UL usage configuration).

A DL/UL usage configuration has no effect on the retransmission control of downlink data or uplink data even if the terminals 600 and 800 do not complete reception/decoding processing by the next time unit. That is, a DL/UL usage configuration is a signal for which a delay can be tolerated compared to a control signal (a DL assignment or a UL assignment) or downlink data transmitted in a downlink transmission region.

In this way, due to the base stations 500 and 700 transmitting a DL/UL usage configuration in a gap period (part of gap #1) at the end of a downlink transmission region, in addition to the aforementioned effects, it is possible to increase the opportunities for the terminals 600 and 800 to switch the time unit or symbol configuration for a downlink and an uplink within a certain time period. Therefore, the configuration of a frame can be altered more dynamically in accordance with the amount of downlink traffic and the amount of uplink traffic, and system throughput can be improved.

Hereinabove, common delay tolerant signal types 1 to 4 have been described.

In this way, in the present embodiment, a delay tolerant signal having no effect on the processing time of the terminal is mapped to a gap period that is a switching point from a downlink transmission region to an uplink transmission region in a time unit (a gap period that is arranged at the end of the downlink transmission region). It is thereby possible to reduce the overhead for gap periods while ensuring the processing times of the terminals 600 and 800 in gap periods. For example, even in a case where gap periods increase in length in consideration of the processing times of the terminals 600 and 800, more assigned resources for delay tolerant signals can be ensured in proportion to the amount by which the gap periods have increased in length.

Based on the above, according to the present embodiment, it is possible to suppress a decline in the utilization efficiency of radio resources caused by gap periods within time units.

Embodiment 4

As described in embodiment 3, in a case where a self-contained operation is used, performance can be improved by transmitting a delay tolerant signal that has no effect on the processing time of the base station or the terminal, at the end of a downlink transmission region within a time unit (that is, a period for the processing time of the terminal within gap #1 in FIG. 1A and FIG. 1B). However, in embodiment 3, it is necessary to notify a frequency resource (assigned resource information) used to transmit a delay tolerant signal, from the base station to the terminal. Therefore, the amount of downlink control signals increases, and the overhead for control signals increases.

Thus, in the present embodiment, a method will be described in which a delay tolerant signal is transmitted without the frequency resource used to transmit the delay tolerant signal being notified by means of a downlink control signal.

It should be noted that the base station and the terminal according to the present embodiment have a basic configuration that is common to the base stations 500 and 700 and the terminals 600 and 800 according to embodiment 3, and will therefore be described with reference to FIG. 22 and FIG. 24 to FIG. 26.

In the present embodiment, the processing of the control signal generators 505 and 705 and the processing of the signal assignment units 510 and 707 of the base stations 500 and 700 in FIG. 22 and FIG. 25 are different from in embodiment 3.

Specifically, the control signal generators 505 and 705 do not generate control information that indicates a frequency resource to which a delay tolerant signal is assigned. That is, the control signal generators 505 and 705 generate assigned resource information for downlink data, uplink data, or a response signal as control information relating to a frequency resource assigned to the terminals 600 and 800.

The signal assignment units 510 and 707 determine a frequency resource (assigned band) to which a delay tolerant signal is assigned, in accordance with a frequency band (assigned band) to which a downlink control signal, downlink data, or uplink data, transmitted in the same time unit as the delay tolerant signal, has been assigned.

Hereinafter, a resource assignment method for a delay tolerant signal in the aforementioned signal assignment units 510 and 707 of the base stations 500 and 700 will be described in detail.

First, resource assignment methods that are common to a DL data self-contained operation and a UL data self-contained operation (common resource assignment method) will be described.

<Common Resource Assignment Method 1>

The terminals 600 and 800 receive a delay tolerant signal in a frequency band notified by means of a higher layer. In this way, by notifying a transmission band for a delay tolerant signal by means of a higher layer notification, the amount of downlink control information can be reduced. Furthermore, data transmitted to both the terminals 600 and 800 such as broadcast information can be received by both the terminals 600 and 800 due to being arranged in a radio resource instructed by means of a higher layer notification.

<Common Resource Assignment Method 2>

The terminals 600 and 800 specify a frequency assignment position for a delay tolerant signal on the basis of a CCE index to which a downlink control signal (for example, a PDCCH that includes a DL assignment or a UL assignment) has been assigned.

Figure 29:
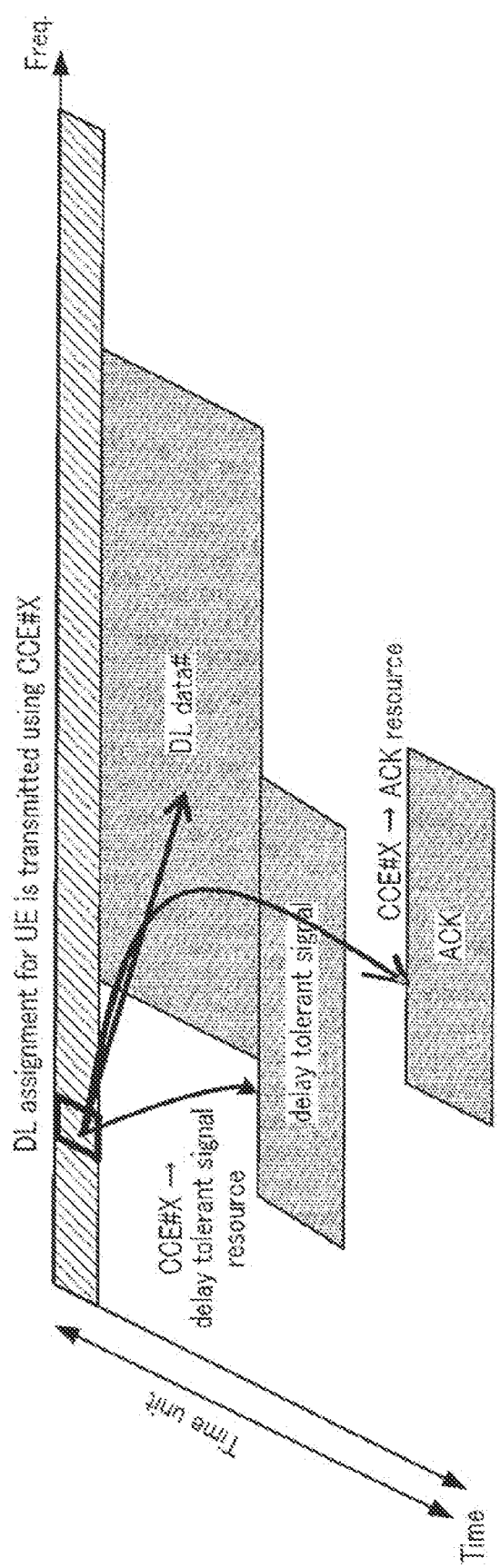
FIG. 29 is a drawing depicting an example of a resource assignment method for a delay tolerant signal according to embodiment 4.

FIG. 29 depicts an example of the assignment of a frequency resource for a delay tolerant signal (the delay tolerant signal of FIG. 29) that is based on a CCE according to common resource assignment method 2.

In the example depicted in FIG. 29, during a DL data self-contained operation, an index of a CCE (downlink resource) to which a DL assignment is assigned and a frequency resource (uplink resource) to which a response signal is assigned are associated on a one-to-one basis.

In FIG. 29, in addition, the CCE index to which the DL assignment is assigned and a frequency resource (uplink resource) to which a delay tolerant signal is assigned are associated on a one-to-one basis.

Here, the number of CCEs, for example, is a value obtained by dividing the number of REs forming a downlink control signal (PDCCH) by 36 (1 CCE=36 REs). Thus, for instance, as an example of the association between CCEs and frequency assignment positions, a usable bandwidth is divided by the number of CCEs, and a usable frequency band is associated with each CCE.

The base station 500 then transmits the delay tolerant signal which is mapped to all or some of a frequency band that is a resource associated on a one-to-one basis in relation to the delay tolerant signal with the index of the CCE (CCE #X in FIG. 29) used to transmit the DL assignment for the corresponding terminal 600. Furthermore, the terminal 600 specifies, as an assigned resource for the delay tolerant signal, all or some of a frequency band that is a resource associated on a one-to-one basis in relation to the delay tolerant signal with the index of the CCE to which the DL assignment addressed thereto has been assigned.

It should be noted that, although FIG. 29 depicts a DL data self-contained operation, similarly also for a UL data self-contained operation, it is sufficient for the index of a CCE used to transmit a UL assignment and a resource used to transmit a delay tolerant signal to be associated on a one-to-one basis.

In this way, a delay tolerant signal is mapped to a resource associated on a one-to-one basis with a resource (CCE index) used to transmit assignment information (a DL assignment or a UL assignment) indicating a resource assignment for data transmitted in the same time unit as the delay tolerant signal. By associating a CCE index and a resource for a delay tolerant signal, signaling for notifying a frequency resource used to transmit the delay tolerant signal is not necessary. Thus, the base stations 500 and 700 can control the frequency assignment position of a delay tolerant signal while reducing the amount of downlink control information. Furthermore, due to the base stations 500 and 700 controlling the assignment of CCEs, it becomes possible for a radio resource for a delay tolerant signal to be changed by the base stations 500 and 700.

<DL Data Self-Contained Resource Assignment Method>

Next, a resource assignment method during a DL data self-contained operation (DL data self-contained resource assignment methods) will be described.

The terminal 600 receives a delay tolerant signal within a frequency band having assigned thereto downlink data, which is transmitted within the same time unit.

Figure 30:
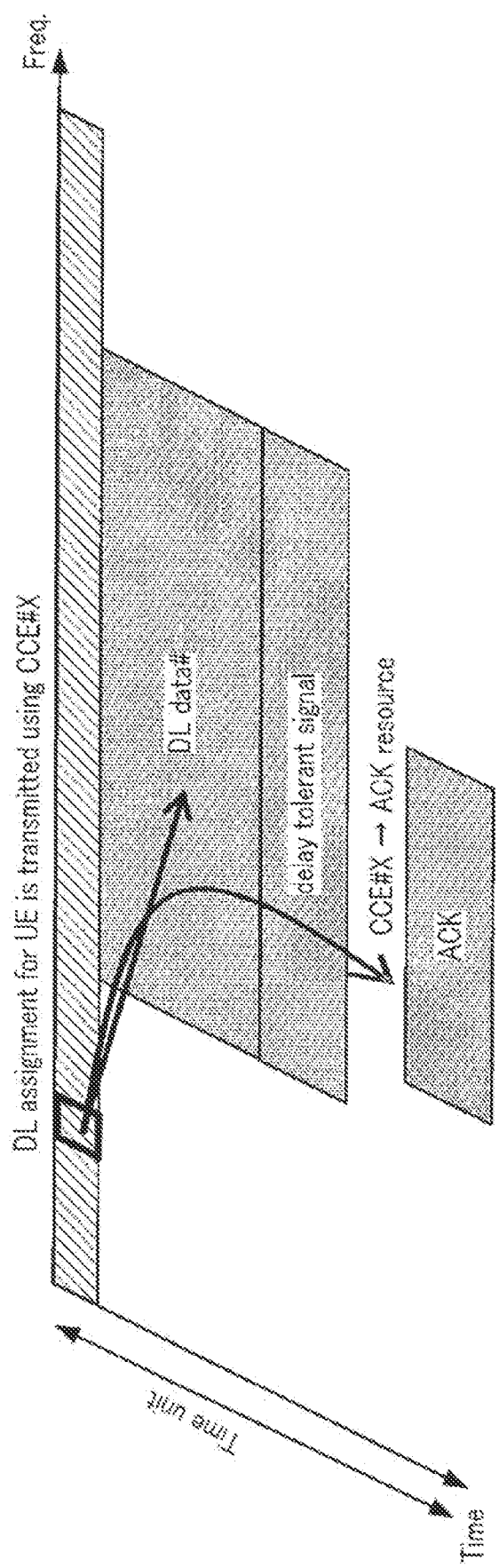
FIG. 30 is a drawing depicting an example of a resource assignment method for a delay tolerant signal according to embodiment 4.

FIG. 30 depicts an example of the assignment of a frequency resource for downlink data and a delay tolerant signal according to a DL data self-contained resource assignment method. In FIG. 30, the base station 500 transmits a delay tolerant signal which is mapped to a resource within the same frequency band as the frequency band used to transmit downlink data for the corresponding terminal 600. The terminal 600 specifies an assigned resource for the downlink data (DL data) by means of the DL assignment addressed thereto. The terminal 600 then specifies a resource within the same frequency band as the frequency band assigned to the downlink data, as the assigned resource for the delay tolerant signal.

It should be noted that, although FIG. 30 depicts an example in which the assigned resource for a delay tolerant signal is the same as for downlink data, the assigned resource for the delay tolerant signal may not be the same as long as it is within the band to which the downlink data is assigned.

Furthermore, in a case where downlink data is transmitted by means of MU-MIMO, delay tolerant signals of a plurality of terminals 600 are assigned to the same band. In this case, a method is feasible in which delay tolerant signals are also transmitted by means of MU-MIMO in a manner similar to downlink data. Furthermore, a method may be adopted in which the assigned band for downlink data is divided by the number of terminals multiplexed by means of MU-MIMO, and, for example, a port number for a reference signal (DMRS) for demodulating downlink data and a divided frequency band are associated.

Furthermore, in a case where a delay tolerant signal is a multicast/broadcast signal, a method may be adopted in which the base station 500 transmits a delay tolerant signal within a frequency band to which downlink data is assigned, irrespective of the downlink data transmission method.

In this way, a delay tolerant signal is mapped to within the same frequency band as the frequency band having assigned thereto downlink data transmitted in the same time unit as the delay tolerant signal. By associating the frequency assignment position of the delay tolerant signal with the downlink data, the amount of downlink control information can be reduced. Furthermore, since the frequency assignment position of the downlink data is the same as for the delay tolerant signal, scheduling in the base station 500 becomes easy. Furthermore, since the downlink data is scheduled, there is a high possibility of a signal being assigned to a frequency band having a high SINR. Thus, a scheduling gain can be obtained by the delay tolerant signal being transmitted in the same band as the downlink data.

<UL Data Self-Contained Resource Assignment Method>

Next, a resource assignment method during a UL data self-contained operation (UL data self-contained resource assignment method) will be described.

The terminal 800 receives a delay tolerant signal within a frequency band having assigned thereto uplink data, which is transmitted within the same time unit.

Figure 31:
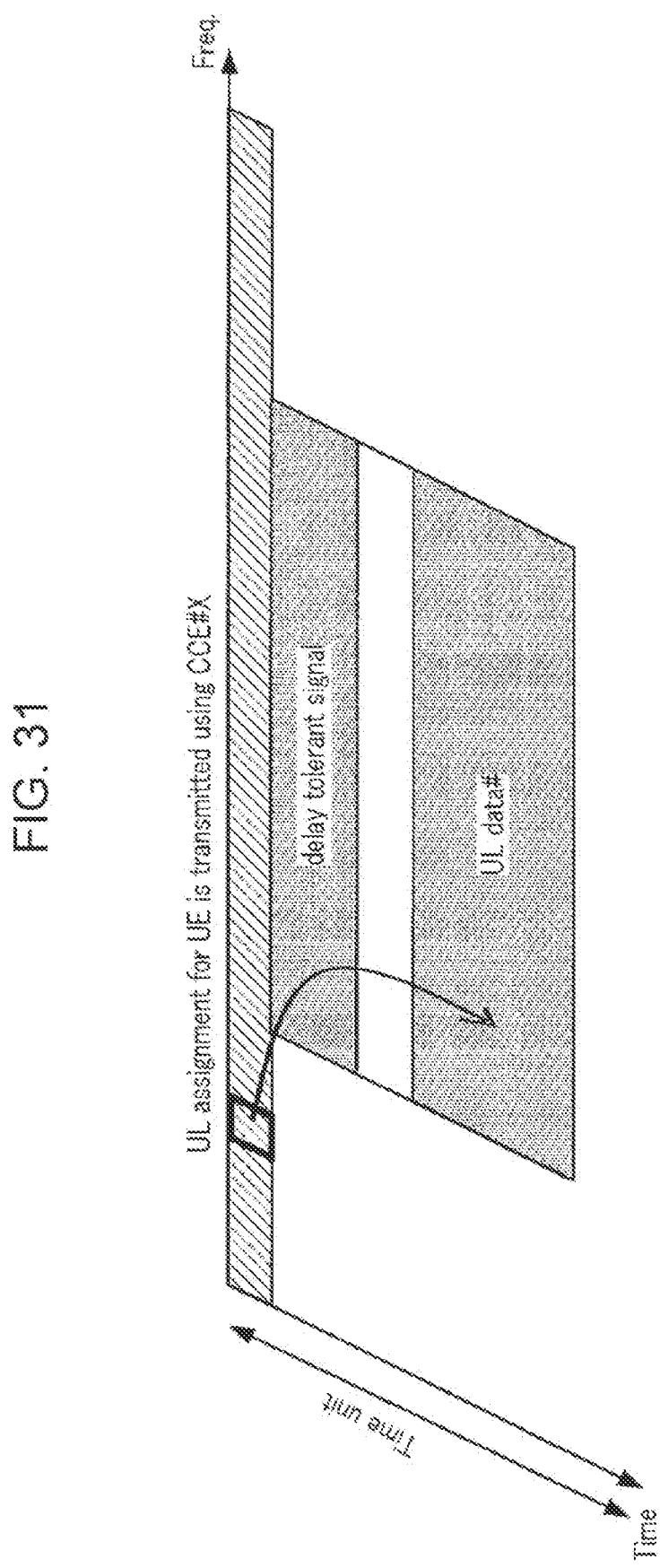
FIG. 31 is a drawing depicting an example of a resource assignment method for a delay tolerant signal according to embodiment 4.

FIG. 31 depicts an example of the assignment of a frequency resource for uplink data and a delay tolerant signal according to a UL data self-contained resource assignment method. In FIG. 31, the base station 700 transmits a delay tolerant signal which is mapped to a resource within the same frequency band as the frequency band used to transmit uplink data (UL data) for the corresponding terminal 800. The terminal 800 specifies an assigned resource for the uplink data by means of a UL assignment addressed thereto. The terminal 800 then specifies a resource within the same frequency band as the frequency band assigned to the uplink data, as the assigned resource for a delay tolerant signal.

It should be noted that, although FIG. 31 depicts an example in which the assigned resource for a delay tolerant signal is the same as for uplink data, the assigned resource for the delay tolerant signal may not be the same as long as it is within the band to which the uplink data is assigned.

Furthermore, in a case where uplink data is transmitted by means of MU-MIMO, delay tolerant signals of a plurality of terminals 800 are assigned to the same band. In this case, a method is feasible in which delay tolerant signals are also transmitted by means of MU-MIMO in a manner similar to uplink data. Furthermore, a method may be adopted in which the assigned band for uplink data is divided by the number of terminals multiplexed by means of MU-MIMO, and, for example, a port number for a reference signal (DMRS) for demodulating uplink data and a divided frequency band are associated.

In this way, a delay tolerant signal is mapped to within the same frequency band as the frequency band having assigned thereto uplink data transmitted in the same time unit as the delay tolerant signal. By associating the frequency assignment position of the delay tolerant signal with the uplink data, the amount of downlink control information can be reduced. Furthermore, since the frequency assignment position of the uplink data is the same as for the delay tolerant signal, scheduling in the base station 700 becomes easy. Furthermore, since the uplink data is scheduled, there is a high possibility of a signal being assigned to a frequency band having a high SINR. Thus, in the case of a TDD system, a scheduling gain can be obtained by the delay tolerant signal being transmitted in the same band as the uplink data.

Hereinabove, the details of resource assignment methods for a delay tolerant signal have been described.

In this way, in the present embodiment, it is not necessary to notify a frequency resource (assigned resource information) used to transmit a delay tolerant signal, from the base stations 500 and 700 to the terminals 600 and 800 using a downlink control signal, and therefore it is possible to prevent an increase in the overhead for control signals.

Hereinabove, embodiments of the present disclosure have been described.

It should be noted that embodiment 1 and embodiment 2 may be combined and implemented.

Furthermore, the aforementioned embodiments describe examples of cases where an aspect of the present disclosure is configured by means of hardware; however, it is also possible for the present disclosure to be realized by means of software in cooperation with hardware.

Furthermore, each functional block used in the description of the aforementioned embodiments is typically realized as an LSI, which is an integrated circuit. The integrated circuits may control the functional blocks used in the descriptions of the aforementioned embodiments, and may be provided with input and output. These may be implemented separately as single chips or may be implemented as a single chip in such a way as to include some or all of the functional blocks. LSIs have been mentioned here; however, the functional blocks are sometimes also referred to as ICs, system LSIs, super LSIs, or ultra LSIs depending on differences in the degree of integration.

Furthermore, the circuit integration technique is not limited to that of an LSI, and a functional block may be realized using a dedicated circuit or a general-purpose processor. After an LSI has been manufactured, an FPGA (field-programmable gate array) that can be programmed, or a reconfigurable processor with which the connections and settings of circuit cells within the LSI can be reconfigured, may be used.

In addition, if circuit integration technology that replaces LSI appears as a result of another technology that is an advancement in semiconductor technology or is derived therefrom, naturally, the other technology may be used to carry out the integration of functional blocks. Biotechnology applications and the like are also a possibility.

A base station of the present disclosure is provided with: a transmitter that transmits a downlink signal in a downlink transmission region, in a time unit that includes the downlink transmission region, an uplink transmission region, and a gap period that is a switching point between the downlink transmission region and the uplink transmission region; and a receiver that receives an uplink signal in the uplink transmission region, in the time unit, in which a delay tolerant signal for which a delay is tolerated more than for the downlink signal and the uplink signal is mapped to within the gap period.

In the base station of the present disclosure, the transmitter transmits the delay tolerant signal mapped to the gap period arranged between the downlink transmission region and the uplink transmission region within the time unit.

In the base station of the present disclosure, the delay tolerant signal is at least one downlink signal from among a MIB (master information block), a SIB (system information block), MBMS (multimedia broadcast and multicast service) data, information indicating a time unit configuration of a downlink and an uplink, or downlink data.

In the base station of the present disclosure, the receiver receives the delay tolerant signal mapped to the gap period arranged after the uplink transmission region.

In the base station of the present disclosure, the delay tolerant signal is at least one uplink signal from among an SRS (sounding reference signal), information indicating a transmission beam pattern, CSI (channel state information), an SR (scheduling request), a BSR (buffer status report), a TCP ACK/SYC, a response signal that is transmitted in the same time unit as the delay tolerant signal, or uplink data that is transmitted in the same time unit as the delay tolerant signal.

In the base station of the present disclosure, the delay tolerant signal is mapped to a resource associated on a one-to-one basis with a resource used to transmit assignment information indicating a resource assignment for data transmitted in the same time unit as the delay tolerant signal.

In the base station of the present disclosure, the delay tolerant signal is mapped to within the same frequency band as a frequency band having assigned thereto a response signal for downlink data transmitted in the same time unit as the delay tolerant signal.

In the base station of the present disclosure, the delay tolerant signal is mapped to within the same frequency band as a frequency band having assigned thereto data transmitted in the same time unit as the delay tolerant signal.

A terminal of the present disclosure is provided with: a receiver that receives a downlink signal in a downlink transmission region, in a time unit that includes the downlink transmission region, an uplink transmission region, and a gap period that is a switching point between the downlink transmission region and the uplink transmission region; and a transmitter that transmits an uplink signal in the uplink transmission region, in the time unit, in which a delay tolerant signal for which a delay is tolerated more than for the downlink signal and the uplink signal is mapped to within the gap period.

A communication method of the present disclosure includes: transmitting a downlink signal in a downlink transmission region, in a time unit that includes the downlink transmission region, an uplink transmission region, and a gap period that is a switching point between the downlink transmission region and the uplink transmission region; and receiving an uplink signal in the uplink transmission region, in the time unit, in which a delay tolerant signal for which a delay is tolerated more than for the downlink signal and the uplink signal is mapped to within the gap period.

A communication method of the present disclosure includes: receiving a downlink signal in a downlink transmission region, in a time unit that includes the downlink transmission region, an uplink transmission region, and a gap period that is a switching point between the downlink transmission region and the uplink transmission region; and transmitting an uplink signal in the uplink transmission region, in the time unit, in which a delay tolerant signal for which a delay is tolerated more than for the downlink signal and the uplink signal is mapped to within the gap period.

INDUSTRIAL APPLICABILITY

An aspect of the present disclosure is useful in a mobile communication system.

REFERENCE SIGNS LIST 100, 300, 500, 700 Base station
101, 301, 501, 701 Scheduler
102, 302, 502, 702 Delay tolerant signal controller
103, 303, 505, 705 Control signal generator
104, 304, 506, 706 Control signal encoder/modulator
105, 403, 507, 805 Data encoder
106, 404, 508, 806 Retransmission controller
107, 405, 509, 807 Data modulator
108, 212, 305, 408, 510, 610, 707, 808 Signal assignment unit
109, 213 Transmitter
110, 201 Antenna
111, 202 Receiver
112, 203, 306, 401, 511, 601, 708, 801 Signal extraction unit
113, 307, 603, 803 Delay tolerant signal demodulator/decoder
114, 308, 604, 804 Delay tolerant signal determination unit
115, 512 Demodulator/decoder
116, 513 Determination unit
200, 400, 600, 800 Terminal
204, 402, 602, 802 Control signal demodulator/decoder
205, 309, 605, 709 Data demodulator
206, 606 Data decoder
207, 311, 607, 711 Error detector
208, 608 Response signal generator
209, 609 Encoder/modulator
210, 406, 503, 703 Delay tolerant signal generator
211, 407, 504, 704 Delay tolerant signal encoder/modulator
310, 710 Retransmission synthesis decoder

The invention claimed is:

1. A terminal, comprising:
a receiver, which, in operation, receives, based on time unit configuration information, a downlink signal in a downlink transmission region, in a subcarrier subframe, the subcarrier subframe including the downlink transmission region, an uplink transmission region, and a gap period between the downlink transmission region and the uplink transmission region, wherein the time unit configuration is dynamically indicated by Downlink Control Information (DCI); and
a transmitter, which, in operation, transmits an uplink signal in the uplink transmission region, in the subcarrier subframe,
wherein a delay tolerant signal for which a delay is tolerated more than for the downlink signal and the uplink signal is mapped to within the gap period in the subcarrier subframe, and
the delay tolerant signal is a sounding reference signal (SRS).

2. The terminal according to the claim 1,
wherein the subcarrier subframe is a Time Division Duplex (TDD) subframe.

3. The terminal according to the claim 1,
wherein the transmitter in operation transmits the delay tolerant signal in the gap period.

4. A communication method for a terminal, the communication method comprising:
receiving, based on time unit configuration information, a downlink signal in a downlink transmission region, in a subcarrier subframe, the subcarrier subframe including the downlink transmission region, an uplink transmission region, and a gap period between the downlink transmission region and the uplink transmission region wherein the time unit configuration is dynamically indicated by Downlink Control Information (DCI); and
transmitting an uplink signal in the uplink transmission region, in the subcarrier subframe,
wherein a delay tolerant signal for which a delay is tolerated more than for the downlink signal and the uplink signal is mapped to within the gap period in the subcarrier subframe, and
the delay tolerant signal is a sounding reference signal (SRS).

5. The communication method according to the claim 4,
wherein the subcarrier subframe is a Time Division Duplex (TDD) subframe.

6. The communication method according to the claim 4, comprising:
transmitting the delay tolerant signal in the gap period.

7. A base station comprising:
a transmitter, which, in operation, transmits, based on time unit configuration information, a downlink signal in a downlink transmission region, in a subcarrier subframe, the subcarrier subframe including the downlink transmission region, an uplink transmission region, and a gap period between the downlink transmission region and the uplink transmission region wherein the time unit configuration is dynamically indicated by Downlink Control Information (DCI); and
a receiver, which, in operation, receives an uplink signal in the uplink transmission region, in the subcarrier subframe,
wherein a delay tolerant signal for which a delay is tolerated more than for the downlink signal and the uplink signal is mapped to within the gap period in the subcarrier subframe, and
the delay tolerant signal is a sounding reference signal (SRS).

8. The base station according to the claim 7, wherein the subcarrier subframe is a Time Division Duplex (TDD) subframe.

9. The base station according to the claim 7, wherein the receiver, in operation, receives the delay tolerant signal in the gap period.

10. A terminal, comprising:
a receiver, which, in operation, receives, control information relating to a time resource of a delay tolerant signal by a higher layer signaling; and
a transmitter, which, in operation, transmits the delay tolerant signal in a time unit based on the control information, the time unit including a downlink transmission region, an uplink transmission region, and a gap period between the downlink transmission region and the uplink transmission region in a subcarrier, wherein a length of the gap period of the time unit is configured by a base station,
wherein the delay tolerant signal is mapped to within the gap period of the time unit, and
the delay tolerant signal is a sounding reference signal (SRS), which is different from a downlink data signal transmitted in the downlink region and an uplink data signal transmitted in the uplink region.

* * * * *